(12) United States Patent  
Niimi

(10) Patent No.: US 7,126,280 B2
(45) Date of Patent: Oct. 24, 2006

(54) JOINED BODIES, ASSEMBLIES FOR HIGH PRESSURE DISCHARGE LAMPS AND HIGH PRESSURE DISCHARGE LAMPS

(75) Inventor: Norikazu Niimi, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 67 days.

(21) Appl. No.: 10/935,095

(22) Filed: Sep. 8, 2004

(65) Prior Publication Data

US 2005/0093453 A1  May 5, 2005

Related U.S. Application Data

(63) Continuation of application No. 10/318,307, filed on Dec. 13, 2002.

(30) Foreign Application Priority Data

Dec. 27, 2001 (JP) .............................. 2001-398054

(51) Int. Cl.
   *H01J 17/18* (2006.01)
(52) U.S. Cl. ........................................ 313/624; 313/625
(58) Field of Classification Search .............. 313/623, 313/634, 493, 636
   See application file for complete search history.

(56) References Cited

U.S. PATENT DOCUMENTS

| 5,288,255 A | 2/1994 | Brabham et al. |
| 5,424,608 A | 6/1995 | Juengst et al. |
| 5,426,343 A | 6/1995 | Rhodes et al. |
| 5,552,670 A | 9/1996 | Heider et al. |
| 2002/0033670 A1 | 3/2002 | Niimi |
| 2002/0033671 A1 | 3/2002 | Niimi |

FOREIGN PATENT DOCUMENTS

| EP | 0 887 838 A2 | 12/1998 |
| EP | 0 887 838 A3 | 3/1999 |
| EP | 0 981 151 A1 | 2/2000 |
| EP | 0 982 278 A1 | 3/2000 |
| EP | 0 987 736 A1 | 3/2000 |
| EP | 1 170 770 A1 | 1/2002 |
| HU | 218226 B | 9/1995 |
| JP | A 2001-58882 | 3/2001 |

OTHER PUBLICATIONS

European Search Report.
Hungarian Novelty Search Report.

*Primary Examiner*—Joseph Williams
(74) *Attorney, Agent, or Firm*—Oliff & Berridge, PLC.

(57) ABSTRACT

The present invention provides a joined body having a first member, a second member and a joining material interposed between the first and second members. The joining material has a porous bone structure with open pores and made of a sintered product of metal powder and impregnated phase impregnated into the open pores. The impregnated phase has polycrystalline substance made from a metal oxide and at least one of a nitride and an oxynitride. The joined body has improved resistance against fatigue and fracture, even when the body is subjected to repeated thermal cycles between high and room temperatures.

38 Claims, 21 Drawing Sheets

(2 of 21 Drawing Sheet(s) Filed in Color)

JOINED BODIES, ASSEMBLIES FOR HIGH PRESSURE DISCHARGE LAMPS AND HIGH PRESSURE DISCHARGE LAMPS

This is a Continuation of Application Ser. No. 10/318,307 filed Dec. 13, 2002, which claims the benefit of Japanese Patent Application P2001-398,054, filed on Dec. 27, 2001, the entirety of which is incorporated by reference. The entire disclosure of the prior application is hereby incorporated by reference herein in its entirety.

BACKGROUND OF THE INVENTION

1. Field of the Invention

The present invention relates to a joined body, a high pressure discharge lamp and an assembly therefor.

2. Description of the Related Art

A high pressure discharge lamp has a ceramic discharge vessel with two end portions. Sealing members (usually referred to as a ceramic plug) are inserted, respectively, to seal the respective end portions. A through hole is formed in each sealing member. A metal member with an electrode system is inserted in the through hole. An ionizable light-emitting material is introduced and sealed in the inner space of the discharge vessel. Known high pressure discharge lamps include a high pressure sodium vapor and metal halide lamps, the latter exhibiting more superior color coordination. The lamp may be used in high temperature condition by forming the discharge vessel by a ceramic material.

In such discharge lamp, it is necessary to air-tightly seal between the end portion of the ceramic discharge vessel and a member for supporting an electrode system. The ceramic discharge vessel has a main body with a shape of a tube with two narrow ends, or a barrel, or a straight tube. The discharge vessel is made of, for example, an alumina sintered body.

A Japanese patent application No. 178,415/1999 (EP 0982278, A1) discloses the following structure. A joining portion is provided between the end portion of a ceramic discharge vessel and a member for supporting an electrode system. The joining portion has joining material contacting the discharge vessel and an intermediate layer contacting the supporting member and existing between the supporting member and the joining material. The joining material is composed of a porous bone structure with open pores and made of a sintered product of metal powder. The joining material further has ceramic phase impregnated into the open pores in the bone structure. Herewith, such joined body has improved air-tightness and resistance against corrosion, so that repeated thermal cycles does not result in the fracture of the joined body.

SUMMARY OF THE INVENTION

The inventor further examined the above sealing structure and, therefore, achieved to provide a joined structure having resistance against fatigue and fracture, even when the structure is subjected to repeated thermal cycles between a high temperature and room temperature. He has further studied a joining structure having improved resistance against a corrosive substance such as a metal halide at a high temperature over a long period of time.

It is an object of the invention to provide a joined body having improved resistance against fatigue and fracture, even when the body is subjected to repeated thermal cycles between high and room temperatures.

It is another object of the invention is to provide a joined body having improved resistance against a corrosive substance at a high temperature for a long period of time.

It is another object of the invention to apply such joined body to a high pressure discharge lamp, for improving the resistance against a corrosive gas and the air-tightness and for avoiding the fracture of the joining portion due to repeated cycles of turning-ons and turning-offs.

The present invention provides a joined body having a first member, a second member and a joining material interposed between the first and second members. The joining material has a porous bone structure with open pores and made of a sintered product of metal powder and impregnated phase impregnated into the open pores of the structure. The impregnated phase is composed of polycrystalline substance made from a metal oxide and at least one of a nitride and an oxynitride.

The present invention further provides a joined body has a first member, a second member and a joining material interposed between the first and second members. The joining material has a porous bone structure with open pores and made of a sintered product of metal powder and impregnated phase impregnated into the open pores of the bone structure. The impregnated phase is composed of polycrystalline substance comprising a complex oxide of a rare earth element and aluminum.

The joined body according to the invention has improved resistance against fatigue and fracture, even when the body is subjected to repeated thermal cycles between high and room temperatures. Moreover, the joined body has improved resistance against a corrosive substance at a high temperature over a long period of time.

The present invention further provides an assembly for a high pressure discharge lamp. The lamp has a ceramic discharge vessel with an inner space formed therein and end portions and an opening being formed in the end portion, an electrode system provided within the inner space; and the joined body described above. An ionizable light-emitting material and a starter gas is to be contained in the inner space. The first member is a metal member, the second member is a sealing member, and the metal and sealing members are air-tightly sealed. The sealing member has a ceramic or a cermet with a through hole formed therein, and at least a part of the sealing member being fixed in the opening of the discharge vessel.

The present invention further provides an assembly for a high pressure discharge lamp. The lamp has a ceramic discharge vessel with an inner space formed therein and end portions and an opening being formed in the end portion, an electrode system provided in the inner space; a metal member. The first member is the metal member, the second member is the discharge vessel, and the metal member and discharge vessel are air-tightly sealed.

The present invention further provides a high pressure discharge lamp having the assembly.

The high pressure discharge lamp according to the invention applies the joined body. It is thus possible to improve the resistance against a corrosive gas and the air-tightness and to avoid the fracture of the joining material due to repeated cycles of turning-ons and turning-offs.

The effects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 17 is a cross sectional view schematically showing another embodiment of an end portion of the inventive lamp, wherein a metal member 7 is joined to an end portion 1a of a discharge vessel 1 and a metal element 7 and a metal axis 27 of an electrode system 27 are electrically connected with a metallized layer 32, covering the surface of the end portion 1a.

DESCRIPTION OF THE PREFERRED EMBODIMENTS

Figure 1:
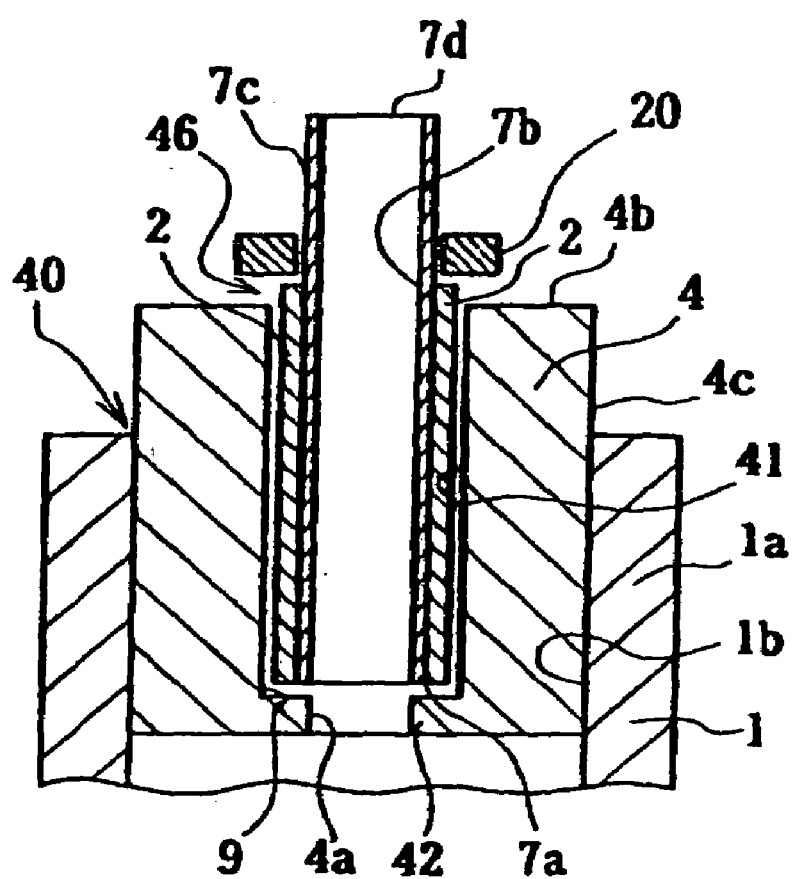
FIG. 1 is a cross sectional view schematically showing a sealing member 4, a metal member 7 and a porous bone structure 2 provided between the members.

The present invention will be described further in detail referring to the attached drawings. FIGS. 1 to 10 are cross sectional views showing an end portion of a high pressure discharge lamp of the invention.

An inner wall surface 1b of an end portion 1a of the discharge vessel 1 is formed so as to extend straightforwardly in the direction of the central axis of the tube. A part of a sealing member 4 is inserted within an opening 40 of the end portion 1a. 4c is an outer surface and 46 is a through hole of the sealing member 4.

A depression or hollow 9 is formed on the inner wall surface 4a of the sealing member 4. A metal member 7 is held in the hollow 9. In the embodiment, the metal member 7 has a shape of a tube and an opening is formed in its end portion 7d. The opening is sealed after introducing a starter gas and an ionizable light-emitting substance. 7b is an inner surface and 7c is an outer surface of the metal member 7. An inner space of the metal member 7 is commuted with an inner space of the discharge vessel 1 (described below). A protrusion 42 is provided on the sealing member 4 and opposes an end portion 7a of the metal member 7, so as to fix the metal member at a specified position.

As shown in FIG. 1, the inventor provided a porous bone structure 2, made of a sintered product of metal powder and with open pores between the metal member 7 and sealing member 4. A ceramic material ring 20 was then positioned on the bone structure 2. The melting point of the bone structure 2 is adjusted so as to exceed that of the ceramic material.

Figure 2:
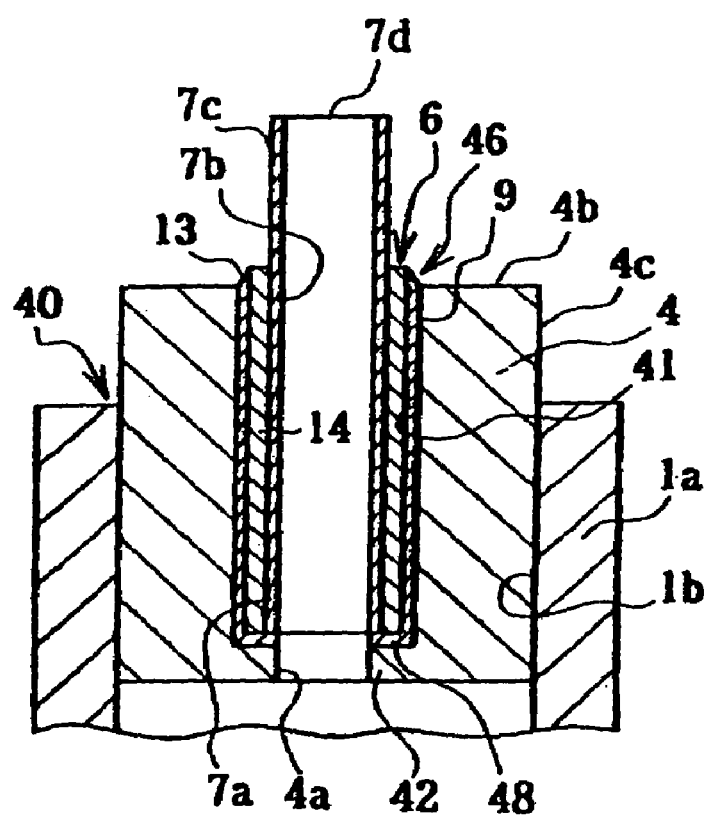
FIG. 2 is a cross sectional view schematically showing a joined body according to the invention.

When the ceramic composition is melted, as schematically shown in FIG. 2, the inventor found that the molten composition was impregnated into the open pores to form joining material 14. The phase 14 has the porous bone structure and ceramic phase impregnated into the open pores. The inventor further found that the thus molten composition is flown into the interface of the sealing member 4 and the joining material 14 so that the bone structure is slightly floated from the surface of the sealing member 4. An intermediate layer 13 may be thus formed. The joining material 14 and intermediate layer 13 together form a joining portion 6 joining the metal member 7 and sealing member 4. 41 represents a joint interface of the sealing member 4. The joining portion 6 extends to the region near the protrusion 42. A joining layer 48 is formed between the protrusion 42 and the end portion 7a of the metal member 7.

Figure 3:
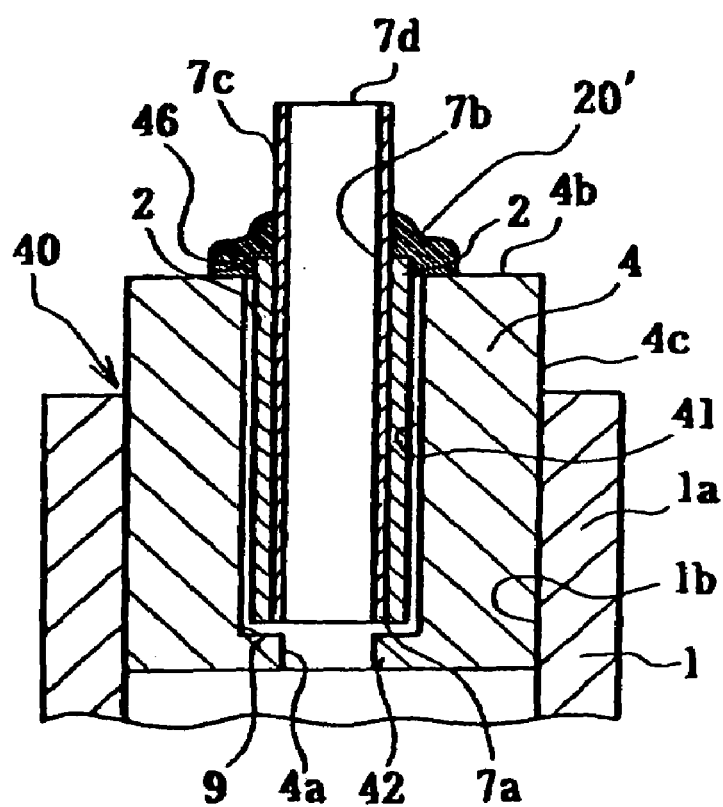
FIG. 3 is a cross sectional view schematically showing a sealing member 4, a metal member 7 and a porous bone structure 2 provided between the members in another embodiment of the present invention.

As shown in FIG. 3, it is also possible to apply paste of ceramic composition 20' on the peripheral parts of the metal member 7, the bone structure 2 and the sealing member 4, instead of positioning the ceramic material ring 20 on the bone structure 2.

Each of the ceramic compositions 20 and 20' contains a metal oxide and at least one of a nitride and an oxynitride. Typically, the composition 20 or 20' is a mixture of nitride powder and metal oxide powder, or, a mixture of oxynitride powder and metal oxide powder. The ceramic composition is molten and impregnated into open pores of the bone structure so that the joining material and intermediate layer described later are formed.

Figure 4:
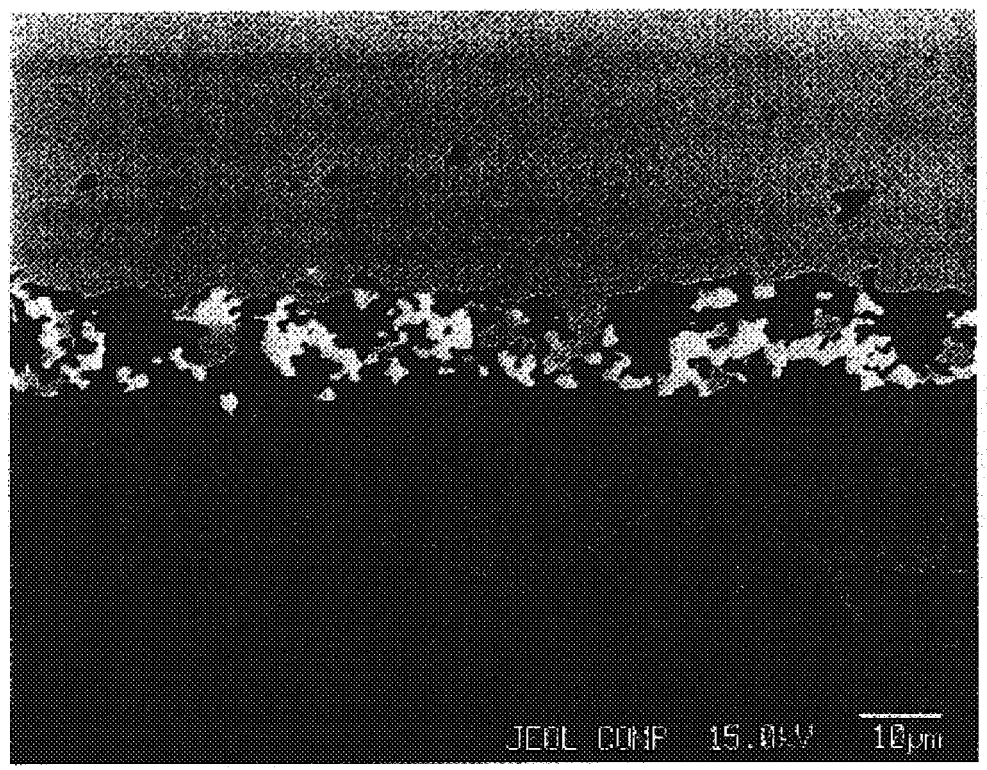
FIG. 4 is a photograph, taken by a scanning type electron microscope, showing a joining portion between metal and sealing members.

A typical example of such joining structure will be explained referring to FIGS. 4 to 10. FIG. 4 is a scanning type microscopic photograph of a joining material and FIG. 5 is a diagram illustrating the photograph of FIG. 4.

A joining portion 6 is formed between the sealing member (second member) 4 and metal member (first member) 7. The joining portion 6 is composed of a joining material 14 present in the side of the metal member 7 and an intermediate layer 13 between the sealing member 4 and joining material 14. In the present example, the joining material 14 is contacted with the metal member 7 and the intermediate layer 13 is contacted with the sealing member 4. In a photograph shown in FIG. 4, gray or black region corresponds with the sealing member 4 and thin gray region corresponds with the metal member 7. Whitish region 15 corresponds with a metal and gray region 10 corresponds with the impregnated phase in the joining material 14.

Figure 6:
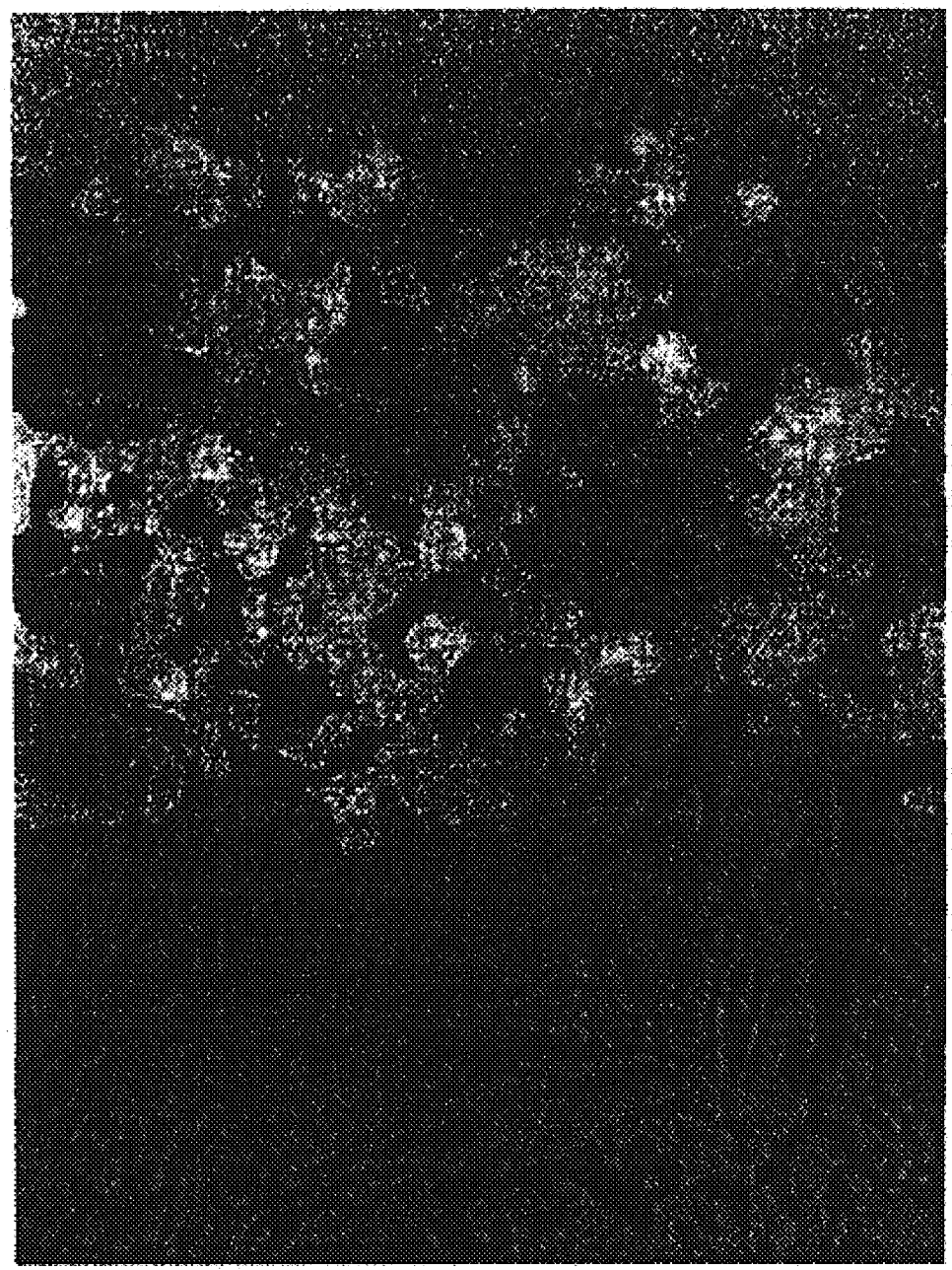
FIG. 6 is a photograph showing an enlarged view of a part of FIG. 4.
Figure 7:
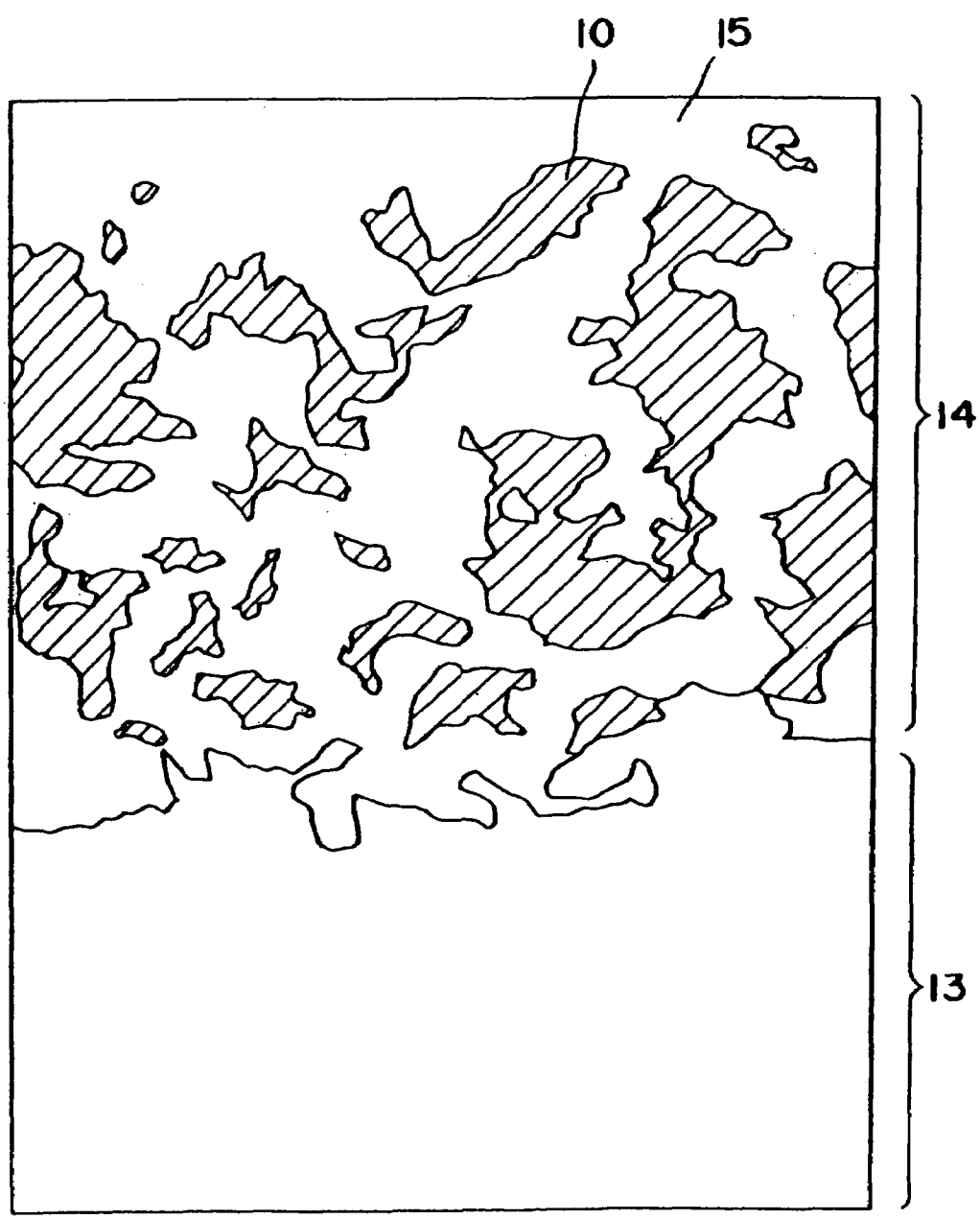
FIG. 7 is a diagram illustrating the photograph of FIG. 6.

FIG. 6 is a photograph showing an enlarged view of an interface between the joining material 14 and intermediate layer 13 in FIG. 4. FIG. 7 is a diagram illustrating the photograph of FIG. 6. Whitish region 15 in the joining material 14 is a porous bone structure made of a metal. Gray impregnated phase 10 is impregnated in the pores of the bone structure 15. In the present example, the intermediate layer 13 and impregnated phase 10 are composed of the substantially same material.

Figure 5:
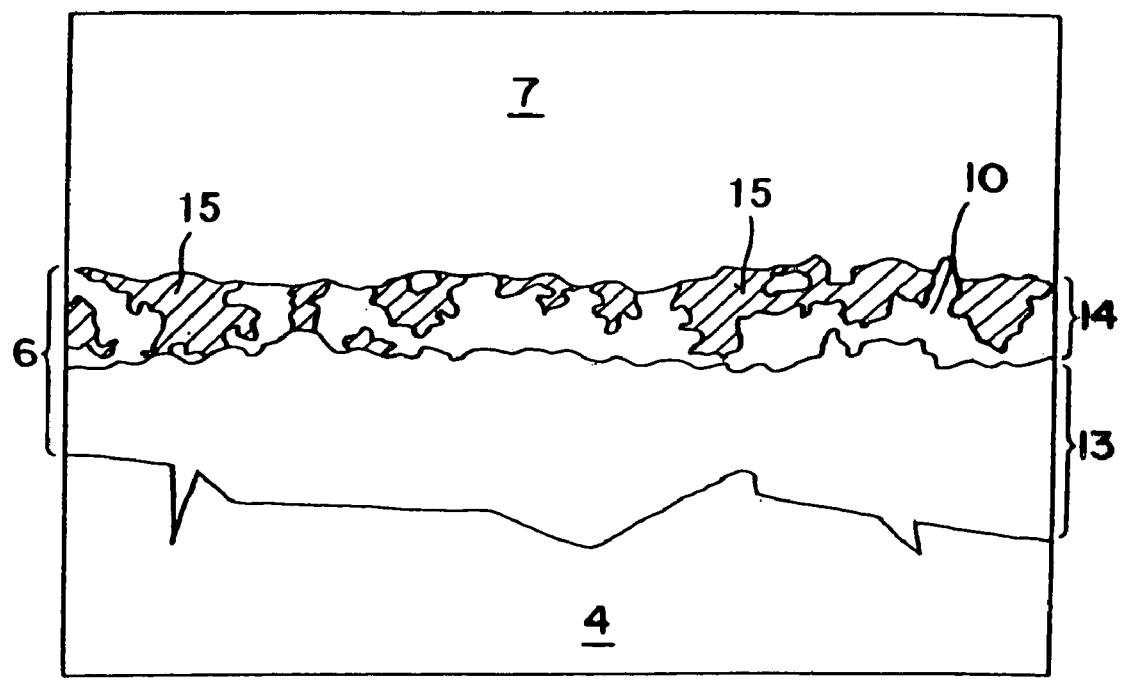
FIG. 5 is a diagram illustrating the photograph of FIG. 4.
Figure 8:
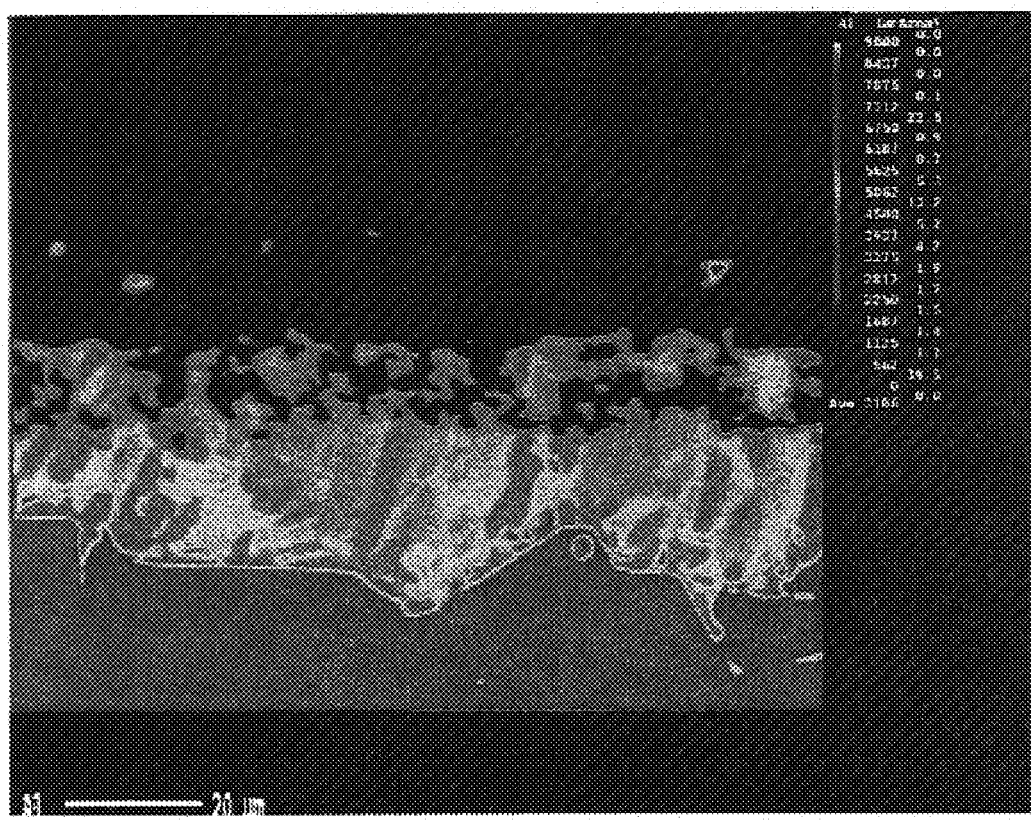
FIG. 8 is a photograph showing results of the distribution of aluminum atoms in the same visual field as that shown in FIG. 4, taken by EPMA.
Figure 9:
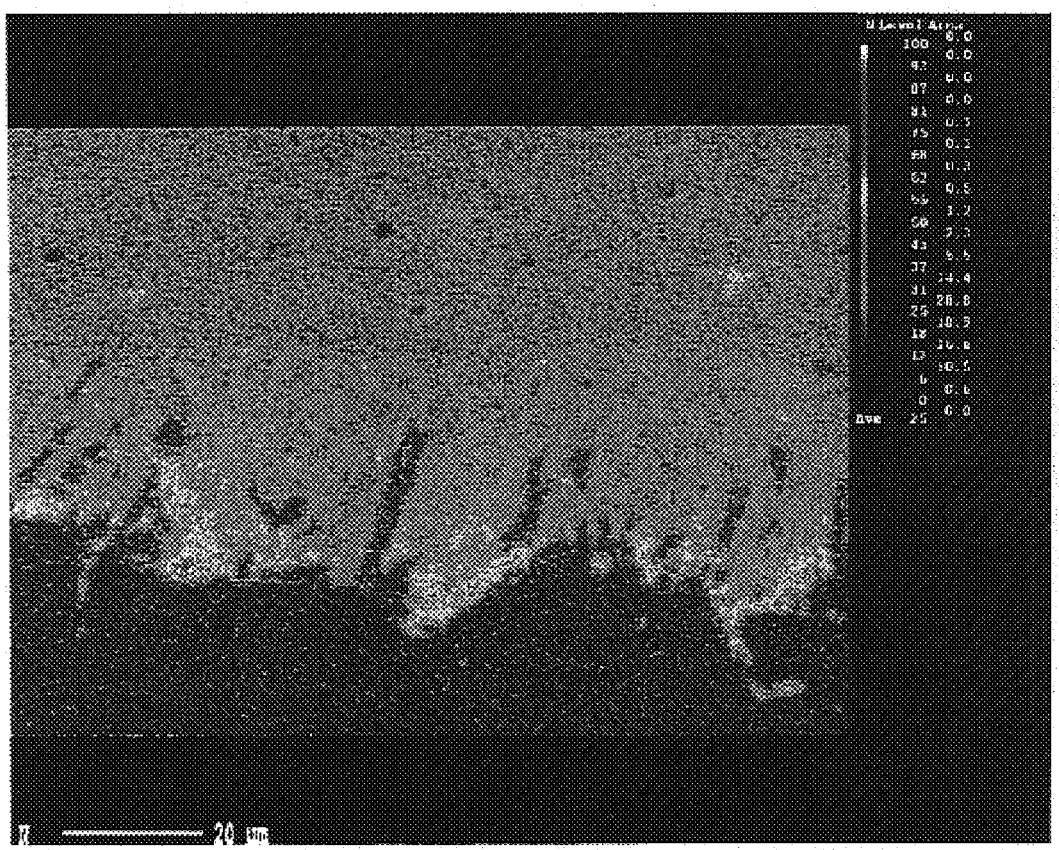
FIG. 9 is a photograph showing results of the distribution of nitrogen atoms in the same visual field as that shown in FIG. 4, taken by EPMA.

FIGS. 8 and 9 are photographs showing results of EPMA analysis over the same visual field as that shown in FIGS. 4 and 5. FIG. 8 shows the content (strength) of aluminum atoms and FIG. 9 shows the content (strength) of nitrogen atoms.

It is proven that the content of aluminum nitride is larger in the sealing member 4. The contents of nitrogen and aluminum atoms are relatively large in the intermediate layer 13 and impregnated phase 13, while nitrogen and aluminum atoms are not found in the bone structure 15. The distribution of aluminum and nitrogen atoms are substantially same in the intermediate layer 13 and impregnated phase 10, so that they are composed of the substantially same material. It is further proven that regions with higher contents of aluminum and regions with lower contents of aluminum are dispersed in both of the intermediate layer 13 and impregnated phase 10.

Figure 10:
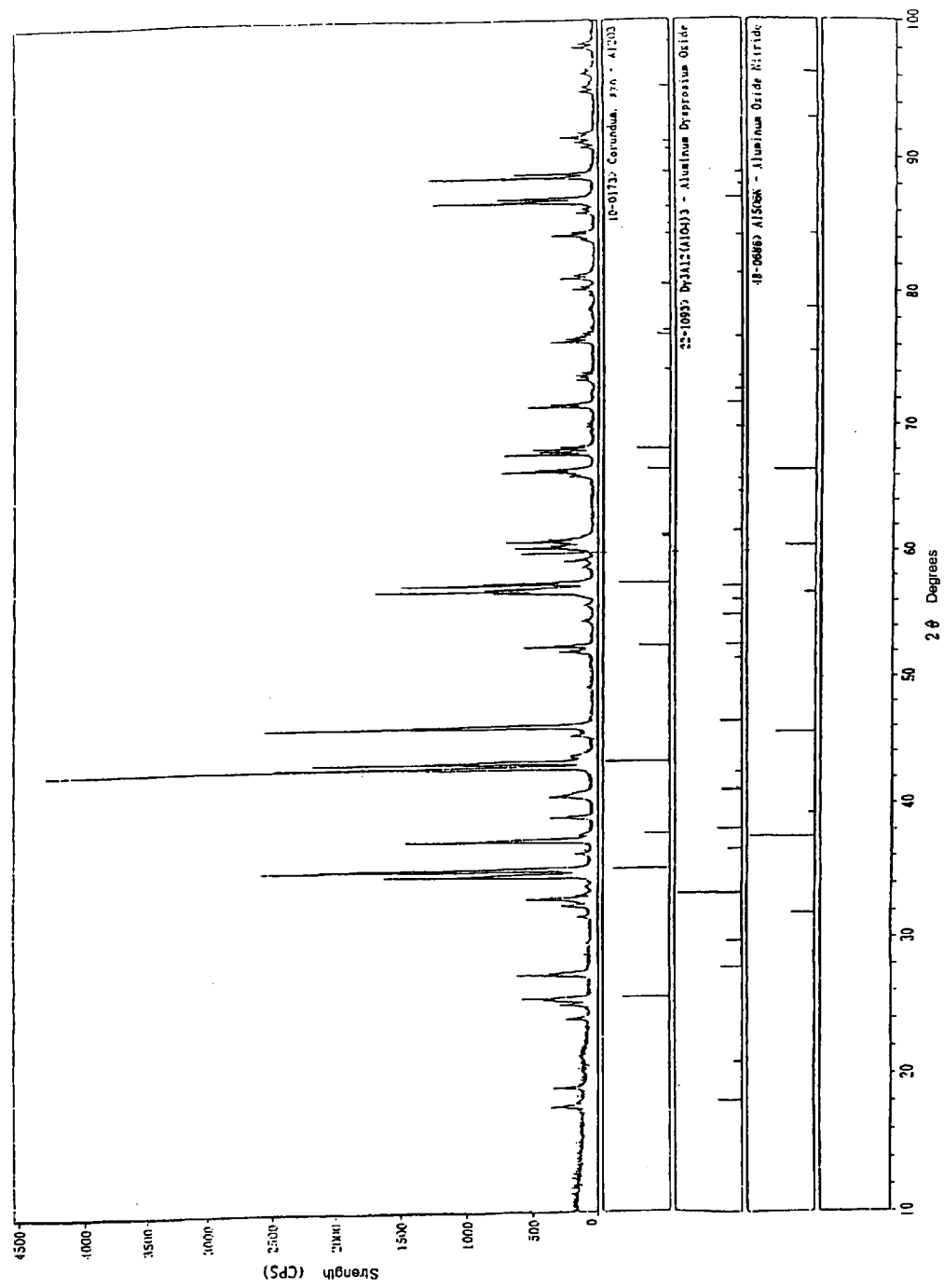
FIG. 10 is an X-ray diffraction chart of a ceramics constituting an intermediate layer and impregnated phase.

The inventor has produced bulky ceramics from the ceramic composition used for the production of the joining material shown in FIGS. 4 to 9 under the conditions applied for the impregnation of the ceramics into the bone structure. He has then analyzed the bulky ceramics by means of an X-ray diffraction system. The results are shown in FIG. 10. Peaks corresponding with alumina, $RE_3AL_2(AlO_4)_3$ (RE represents a rare earth element: rare earth element-aluminum garnet), and aluminum oxynitride are observed.

According to the above process, the ceramic composition 20 or 20' is set around the porous bone structure and molten and impregnated into the pores of the bone structure. During the process, a part of the molten composition is diffused into the gap between the bone structure and metal member so that the bone structure is floated on the molten composition. When the molten composition is solidified, the rare earth element-aluminum complex oxide is precipitated in a mixed state as described above to form an eutectic crystal.

The thus produced joining material has a high strength, a relatively small thermal expansion and improved resistance against thermal shock and thermal cycles. Particularly when the second member is made of a ceramics or cermet having a relatively small thermal expansion, the tensile strength applied on the joining material from the second member is small so that the resistance against thermal cycles may be improved. In addition to this, the joining material has excellent resistance against a corrosive substance such as a metal halide. It is thus possible to prevent the corrosion of the joining material when it is exposed to a corrosive substance at a high temperature over a long period of time.

A porous bone structure is made of a sintered product of metal powder. The metal powder may preferably be made of a metal selected from the group consisting of molybdenum, tungsten, rhenium, niobium, tantalum and the alloys thereof. For further improving the resistance of the structure against a halogen, a metal selected from the group consisting of molybdenum, tungsten, rhenium and the alloys thereof is particularly preferable.

The porous bone structure may preferably has a porosity, of open pores, of not lower than 15%, and more preferably not lower than 40%, thus improving the strength of the joining material. The porosity may preferably be not higher than 80%, and more preferably be not higher than 70%. It is thereby possible to effectively impregnate the ceramic into the open pores of the bone structure and to disperse the stress applied on the structure so that the resistance against repeated thermal cycles may be improved.

The polycrystalline substance constituting the intermediate layer and impregnated phase will be further described. In a preferred embodiment, the metal oxide constituting the ceramic material contains a rare earth oxide. A complex oxide phase may be formed in the eutectic crystal to improve the resistance against a corrosive substance.

The rare earth oxide is the oxide or oxides of one or more element selected from the group consisting of samarium, scandium, yttrium, lanthanum, cerium, praseodymium, neodymium, promethium, europium, gadolinium, terbium, dysprosium, holmium, erbium, thulium, ytterbium and rhutenium. Particularly preferably, one or more oxide(s) selected from the group consisting of $SC_2O_3$, $Y_2O_3$, $La_2O_3$, $Gd_2O_3$, $Dy_2O_3$, $Ho_2O_3$ and $Tm_2O_3$.

In a preferred embodiment, the metal oxide includes alumina. It is thus possible to further improve the resistance against a corrosive substance of the joining material and intermediate layer.

The metal oxide may be one or more oxide(s) selected from the group consisting of $SiO_2$, $MoO_2$ and $MoO_3$.

To prevent corrosion caused by a corrosive light-emitting gas contained in the discharge vessel over a long term, the composition of $SiO_2$ susceptible to corrosion may preferably be 15 weight percent or less, and more preferably 5 weight percent or less. On this viewpoint, the content of $SiO_2$ may more preferably be not higher than 1 weight percent and most preferably $SiO_2$ is not substantially contained. However, $SiO_2$ also acts as a kind of binder to retain a shape of the ceramic material when this joined body is produced. Therefore, on the viewpoint of improving the shape retaining character, $SiO_2$ may preferably be contained 5 ppm or more, and more preferably 20 ppm or more.

The nitride may preferably be aluminum nitride, boron nitride, molybdenum nitride, tungsten nitride or silicon nitride.

In a preferred embodiment, the nitride comprises one or more nitride selected from the group consisting of aluminum nitride, boron nitride and silicon nitride. The nitride may most preferably contain aluminum nitride.

In a preferred embodiment, the oxynitride includes aluminum oxynitride. The oxynitride of aluminum is generally a non-stoichiometric compound and may be represented by the formula $Al_{(64+x)/3}\square_{(8-x)/3}O_{32-x}N_x$ ($\square$ represents vacancy). Typically x represents 5.

In a preferred embodiment, the ceramics has the following composition.

A rare earth oxide: not lower than 10 weight percent and not higher than 40 weight percent (more preferably not higher than 20 weight percent)

Alumina: not lower than 30 weight percent and not higher than 70 weight percent (more preferably not lower than 45 weight percent, and/or, not higher than 55 weight percent)

At least one of a nitride and an oxynitride:
  not lower than 10 weight percent and not higher than 60 weight percent (more preferably not lower than 20 weight percent, and/or, not higher than 45 weight percent)

When the content of any one of the components exceeds the respective upper limit, the melting point may be within the softening region of the joined first or second member. The workability during the joining process may thus be deteriorated and the strength of the joined body may be reduced. When the total content of a nitride and oxynitride is lower than the lower limit, the thermal expansion coefficient of the ceramic phase may be increased to reduce the reliability of the joining material. When the content of any one of a rare earth oxide and alumina is lower than the each lower limit, the polycrystalline state after the melting and solidification may be inhomogeneous. The regions having different thermal expansion coefficients may be thereby increased to reduce the reliability of the joining material.

Particularly preferably, the following eutectic compositions each having three components are preferred, because such composition has a relatively high melting point of about 1700° C.

$Dy_2O_3$—$Al_2O_3$—AlN, $Sc_2O_3$—$Al_2O_3$—AlN, $Y_2O_3$—$Al_2O_3$—AlN, $Dy_2O_3$—$Al_2O_3$—$Si_3N_4$, $Sc_2O_3$—$Al_2O_3$—$Si_3N_4$, and $Y_2O_3$—$Al_2O_3$—$Si_3N_4$.

Further in the present invention, the polycrystalline substance impregnated in the porous bone structure contains a complex oxide of a rare earth element and aluminum. The composite material having the porous bone structure and the impregnated polycrystalline substance has excellent resistances against a corrosive substance and thermal cycles.

The rare earth element includes the rare earth elements described above in (0033). The complex oxide of a rare earth element and aluminum includes that having garnet and perovskite crystalline structures. In the complex oxide, the molar ratio of a rare earth element and aluminum is not limited. The complex oxide may preferably have garnet crystalline structure.

In a preferred embodiment, the polycrystalline substance includes an oxynitride of aluminum. The oxynitride of aluminum is generally a non-stoichiometric compound and may be represented by the formula $Al_{(64+x)/3}\square_{(8-x)/3}O_{32-x}N_x$ ($\square$ represents vacancy). Typically x represents 5.

In a preferred embodiment, the polycrystalline substance contains alumina. In a still preferred embodiment, the polycrystalline substance is an eutectic crystal containing a complex oxide of a rare earth element and aluminum and an oxynitride of at least one of aluminum and silicon.

In a preferred embodiment, the intermediate layer and impregnated phase have the substantially same kind of composition. This means that both belong to the same ingredient system as a whole, thereby improving the strength of the joining material. The intermediate layer and impregnated phase further preferably have the substantially same composition. This means that the intermediate layer and impregnated phase are derived from mixture having the same composition.

The joined body in the present invention is particularly suitable to a high pressure discharge lamp. In this case, such high pressure discharge lamp may be extremely stable against repeated cycles of turning-on and turning-off and a corrosive gas contained within the inner space of a ceramic discharge vessel. An inert gas, an ionizable light-emitting substance and optionally mercury may be introduced into the inner space of the discharge vessel. Alternatively, mercury is not contained and high pressure inert gas such as xenon gas may be used. The high pressure discharge lamp according to the present invention may be applied to not only a lamp for general lighting but also a head lamp for a vehicle.

The inventive joined body may be widely applied to, other than a high pressure discharge lamp, all the structural bodies, such as a switching device of vacuum, having a conductive portion or terminal whose air-tightness at a high temperature of about 900° C. is indispensable. The joined body may also be applied to applications that the body is to be exposed to a corrosive gas, particularly a halogen-based corrosive gas.

The first and second members may be made of a material not particularly limited including a ceramics, metal and cermet. Preferably, the first member is made of a metal and the second member is made of a ceramics or cermet.

The metal member may be made of one or more metal selected from the group consisting of molybdenum, tungsten, rhenium, niobium, tantalum and alloys thereof.

Among them, niobium and tantalum have thermal expansion coefficients matching with that of a ceramic, especially alumina ceramic, constituting a ceramic discharge vessel. However, it is known that niobium and tantalum are susceptible to corrosion by a metal halide. Therefore, it is desirable to form a metal member by a metal selected from the group consisting of molybdenum, tungsten, rhenium and the alloys thereof, for improving the life of the metal member. However, such metals, with high resistance against a metal halide, generally have a low thermal expansion coefficient. For example, alumina ceramic has a thermal expansion coefficient of $8\times10^{-6}$ $K^{-1}$, molybdenum has that of $6\times10^{-6}$ $K^{-1}$, and tungsten and rhenium have those of not more than $6\times10^{-6}$ $K^{-1}$. In such a case, as described above, the inventive joined structure effectively reduces the stress due to the difference of the thermal expansion coefficients of the metal member and the discharge vessel or sealing member.

Molybdenum is suitably used for the invented structure in such advantages that it has high resistance against a metal vapor, particularly a metal halide gas, and that it has high wettability to a ceramic.

When molybdenum is used as a material of a metal member, at least one of $La_2O_3$ and $CeO_2$ may preferably be added to molybdenum in a ratio of 0.1 to 2.0 weight percent as a total.

The main components of the metals constituting the metal member and constituting the porous bone structure may preferably be the same and more preferably molybdenum. Such (main component) means that the component constitutes not lower than 60 weight percent of the metal.

The second member (for example a sealing member or light-emitting vessel) is made of a ceramic or cermet. The ceramic may preferably be a ceramic alone, selected from the group consisting of alumina, magnesia, yttria, lanthania and zirconia, or the mixed compound thereof.

More specifically, the sealing member may be made of the same or the different kinds of ceramics as that of the ceramic discharge vessel. When the electric conductor is made of niobium or tantalum, the discharge vessel and sealing member may preferably be made of the same kind of ceramics. Because in this case the thermal expansion coefficient of the electric conductor is approaching those of the discharge vessel and sealing member. Such (same kind of material) means that their base components of the ceramic materials are the same and the added component or components may be the same or different with each other.

When the metal member is made of molybdenum, tungsten, rhenium or the alloys thereof, the difference of the thermal expansion coefficients of the ceramic discharge vessel and metal member are relatively large. Therefore, it is preferable to adjust the thermal expansion coefficient of the sealing member between those of the electric conductor and the end portion of the discharge vessel. For that reason, the sealing member may be formed of a cermet.

A cermet is a composite material of a ceramic and a metal. Such ceramic may preferably be a ceramic alone, selected from the group consisting of alumina, magnesia, yttria, lanthania and zirconia, or the mixed compound thereof. The ceramics may more preferably be the same kind of ceramic as that of the ceramic discharge vessel, thereby making it possible to co-fire the discharge vessel and sealing member simultaneously. On this point of view, the ceramic components of the discharge vessel and cermet may more preferably be alumina ceramic.

The metal component of the cermet may preferably be a metal having a high temperature melting point and resistance against a metal halide, such as tungsten, molybdenum, rhenium or the like, or the alloys thereof. It is thus possible to improve the resistance of the sealing member against a metal halide. The cermet may preferably has not lower than 55 weight percent and more preferably not lower than 60 weight percent, of the ceramic component of the cermet (the balance is a metal component.).

Preferably, each of a material constituting the intermediate layer and impregnated phase has a melting point not higher than a temperature subtracted 200° C. from a melting point of a ceramic or a cermet constituting the second member. It is thus possible to prevent crack formation in grain boundaries in the second member. In this case, the melting point of each materials is not lower than 1500° C. for securing the reliability of the joining material.

On the view point of wettability, each ceramic may preferably contain a main component of the ceramic or cermet constituting the second member. The "main component" herein means a ceramic component constituting 70 weight percent or more of the ceramic, or a ceramic component constituting 60 weight percent or more of the cermet.

In a preferred embodiment, the polycrystalline phase constituting the impregnated phase (and optionally intermediate layer) has a degree of crystallinity of not lower than 50 percent. The high pressure discharge lamp according to the present invention has excellent resistance at heat resisting temperatures not higher than 1000° C. and also not lower than 1000° C. The reasons will be described.

Figure 11:
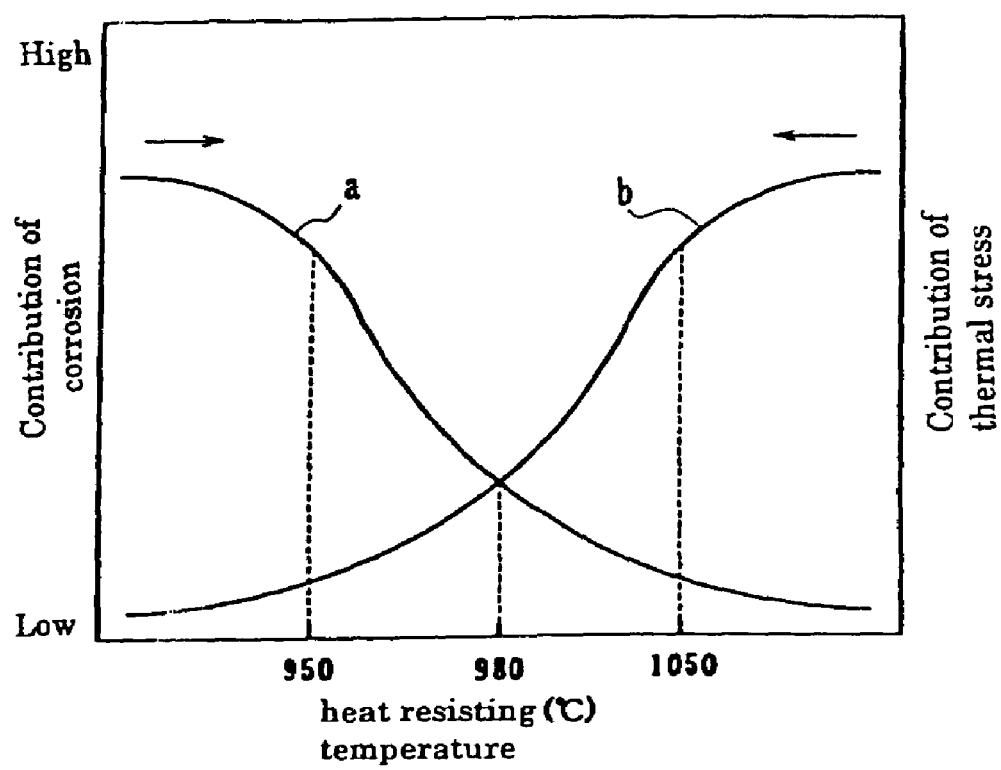
FIG. 11 is a diagram showing the relationship between the heat resisting temperature and corrosion resistance of a high pressure discharge lamp.

The inventors has found that there are thermal stress and corrosion factors in the failure mechanism of a high pressure discharge lamp. It is also found that the thermal stress factor is dominant in one temperature range and the corrosion factor is dominant in another temperature range. FIG. 11 is a diagram showing the relationship among the heat resisting temperature, the thermal stress, and the corrosion of the discharge lamp. As shown in FIG. 11, the thermal stress factor is dominant at a heat resisting temperature not higher than 980° C. (preferably 950° C. or lower). Further, the corrosion factor is dominant at a heat resisting temperature not lower than 980° C., preferably 1000° C. or higher.

The above mentioned phenomenon can be explained as follows. It is thought that the thermal stress is proportional to the difference between the real temperature and a melting point (the softening temperature) of the object. Therefore, as shown by curve "a" in FIG. 11, the contribution of the thermal stress decreases as the temperature elevates. A substantial thermal stress does not occur at a temperature equal to or higher than the melting point.

On the other hand, as shown by curve "b" in FIG. 11, the contribution of corrosion (the chemical reaction) decreases as the heat resisting temperature decreases. This is because the activity of an ionizable light-emitting material filled in the discharge vessel is reduced as the temperature of the discharge vessel, so that attacks to the inner wall of the discharge vessel may be reduced.

The thermal stress factor is dominant in the failure mechanism of a high pressure discharge lamp at a temperature of 950° C. or lower. The ceramics constituting the impregnated phase or intermediate layer has a relatively low thermal expansion to prevent the fracture in the condition the thermal stress factor is dominant.

On the other hand, the corrosion factor is dominant in the failure mechanism of a high pressure discharge lamp at a temperature of 1000° C. or higher (particularly 1050° C. or higher). The joining material and intermediate layer have excellent corrosion resistance so that the joining material exhibits excellent corrosion resistance at such high temperature range.

In particular, when the intermediate layer and impregnated phase have a degree of crystallinity of not lower than 50 percent, the corrosion resistance at a high temperature may be further enhanced. Moreover at a temperature of 1000° C. or higher, the thermal stress factor may be reduced as described above so that the failure of the lamp may be avoided.

When a rare earth halide is contained in the inner space of the vessel as a main component of an ionizable light-emitting substance, the contribution of the corrosion factor may be substantial at a temperature not higher than 1000° C. (even not higher than 980° C.) due to the strong corrosiveness of the halide. In this case, the degree of crystallinity of the ceramics constituting the impregnated phase and intermediate layer may preferably be not lower than 50 percent, irrelevant of the heat resisting temperature. In this case, it is necessary that the content of the halide is not lower than 15 weight percent of an ionizable light-emitting substance (excluding a starter gas) contained in the vessel. The halide includes $DyI_3$ and $ScI_3$.

For further improving the corrosion resistance, the crystalline region of the ceramics constituting the impregnated phase or intermediate layer may preferable be not lower than 55 percent, and more preferably be not lower than 60 percent and further not lower than 70 percent, and most preferably be not lower than 80 percent. The upper limit is not particularly limited and may be 100 percent.

The above described joining material according to the present invention may be applied to both ends of a ceramic discharge vessel. However, in one end, it is preferred to apply a tubular-shaped metal member for introducing an ionizable light-emitting substance through the metal member into the inner space of the vessel. In the other end, metal members with various shapes such as a rod, a tube or the like may be applied.

The shape of the metal member may preferably be a tube for defining a clearance. The shape of a ceramic discharge vessel is not particularly limited, and includes a tube, a cylinder, a barrel or the like. When the metal member is a tubular shaped member supporting an electrode system, an ionizable light-emitting substance may be introduced into the inner space of the discharge vessel through the metal member. The electrode-system-supporting member is then sealed by laser welding or TIG welding. When using laser welding, for example, Nd/YAG laser is used. In this case, a clearance between the electrode-supporting metal member and the electrode to be inserted into the metal member is between 30 to 150 μm in radial directions. The reason is as follows. If the clearance is too large, the light-emitting material tends to accumulate in the clearance so that the unevenness of the property increases. If the clearance is too small, the electrode system substantially contacts the electrode-system-supporting member and the thermal stress of the joining material thereof increases so that there is a tendency to break the joining material.

FIGS. 1, 2, 3, 12, 13 and 14 show the steps in a process of producing the end portion of the lamp according to the present invention. A joining portion 6 of the invention is interposed between a sealing member 4 and a metal member 7 to join them with each other and to secure air-tightness.

Figure 12:
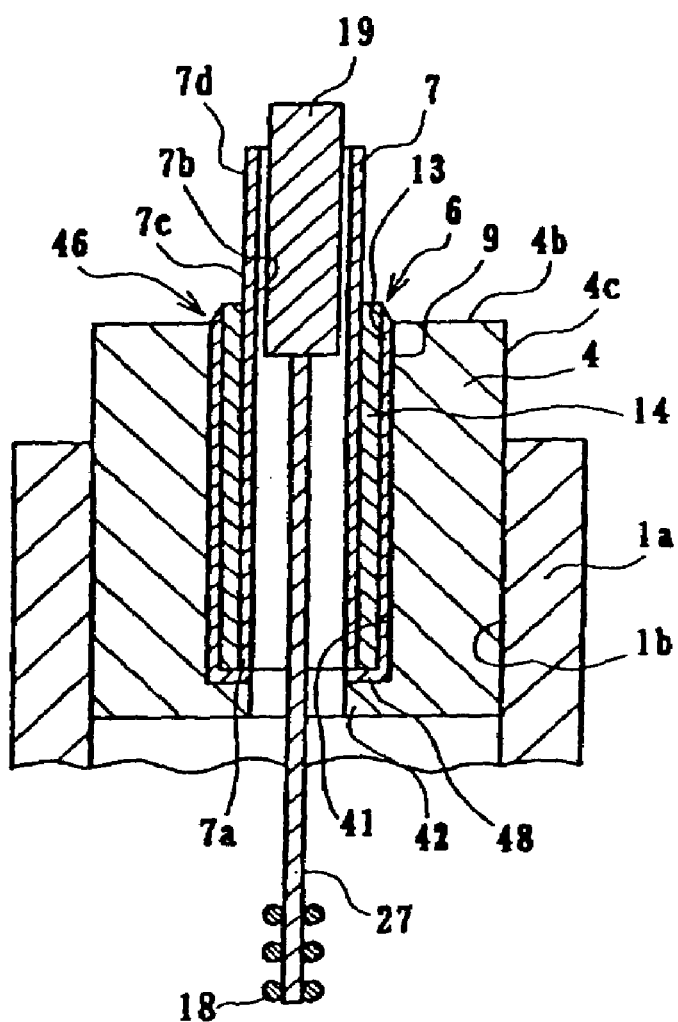
FIG. 12 is a cross sectional view showing a tube-shaped metal member 7 and a sealing member 19 inserted in the metal member 7 of the lamp of FIG. 2.
Figure 13:
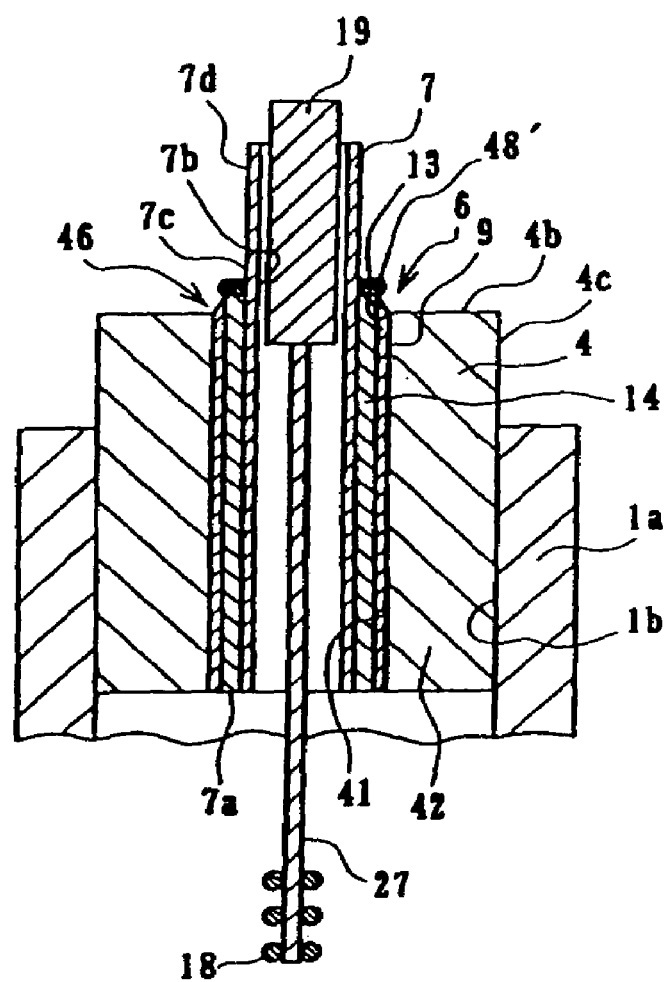
FIG. 13 is a cross sectional view showing a tube-shaped metal member 7 and a sealing member 19 inserted in the metal member 7 of the lamp of FIG. 2, according to another embodiment.
Figure 14:
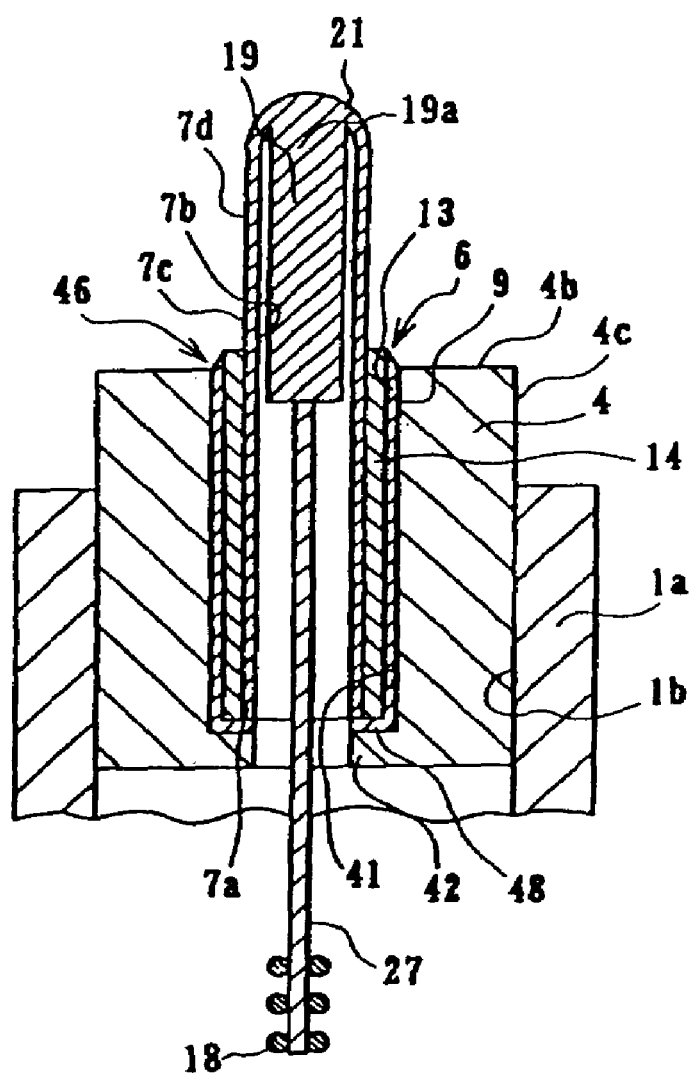
FIG. 14 is a cross sectional view showing a high pressure discharge lamp after the metal member 7 of FIG. 12 and a sealing member 19 are joined to form a sealing portion 21.

As shown in FIG. 12, an axis 27 of an electrode system 18 is attached to a sealing member 19 (preferably made of a metal), and the electrode system 18 is inserted into the inner space of a ceramic discharge vessel. The sealing member 19 is inserted into the inner space of the metal member 7. As shown in FIG. 13, it is possible to expose a metal end 7a to the inner space of the discharge vessel and provide a stopper 48'. As shown in FIG. 14, an end portion 19a of the sealing member 19 is joined by means of the above welding or the like to the metal member 7 so that a sealing portion 21 is formed. It is thereby possible to seal an ionizable light-emitting substance and a starter gas in the inner space of the discharge vessel from the outer atmosphere and to provide an electric power to the electrode system 18 through the sealing member 19. A protrusion 42 functions to position the metal member 7 and to make flow path of the corrosive gas longer.

Figure 15:
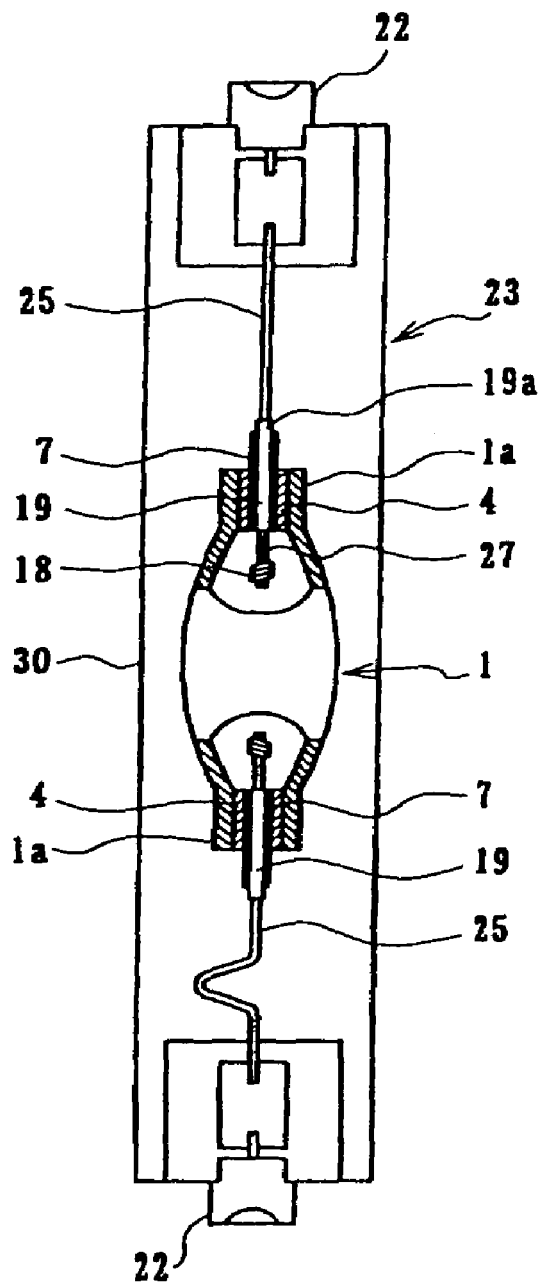
FIG. 15 is a diagram schematically showing an example of a high pressure discharge lamp.

FIG. 15 is a diagram schematically showing an embodiment of a high pressure discharge lamp. A high pressure discharge lamp system 23 has an outer tube 30 generally made of a hard glass, in which a high pressure discharge lamp 1 is contained. The outer tube 30 has both ends sealed with ceramic caps 22. Each sealing member 19 is inserted into and joined with each metal member 7. An outer lead wire 25 is connected with each outer end 19a of each sealing member 19.

Figure 16:
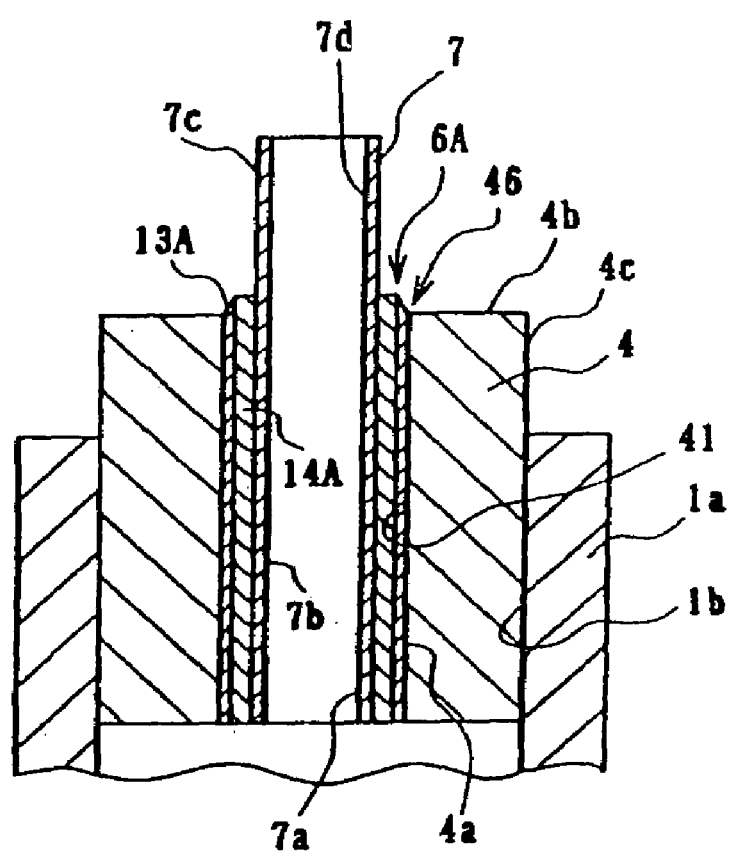
FIG. 16 is a cross sectional view schematically showing an embodiment of an end portion of a high pressure discharge lamp according to the invention, wherein a metal member 7 is joined to the inner wall surface of a sealing member 4 substantially along the full length of the wall.

In the embodiment shown in FIG. 16, the sealing member 4 has no protrusion on its inner wall surface. The metal member 7 and the inner wall surface 4a of the sealing member 4 are joined substantially along the full length of the through hole 46 of the member 4. 6A is a joining material, 13A is an intermediate glass layer and 14A is joining material.

Figure 17:
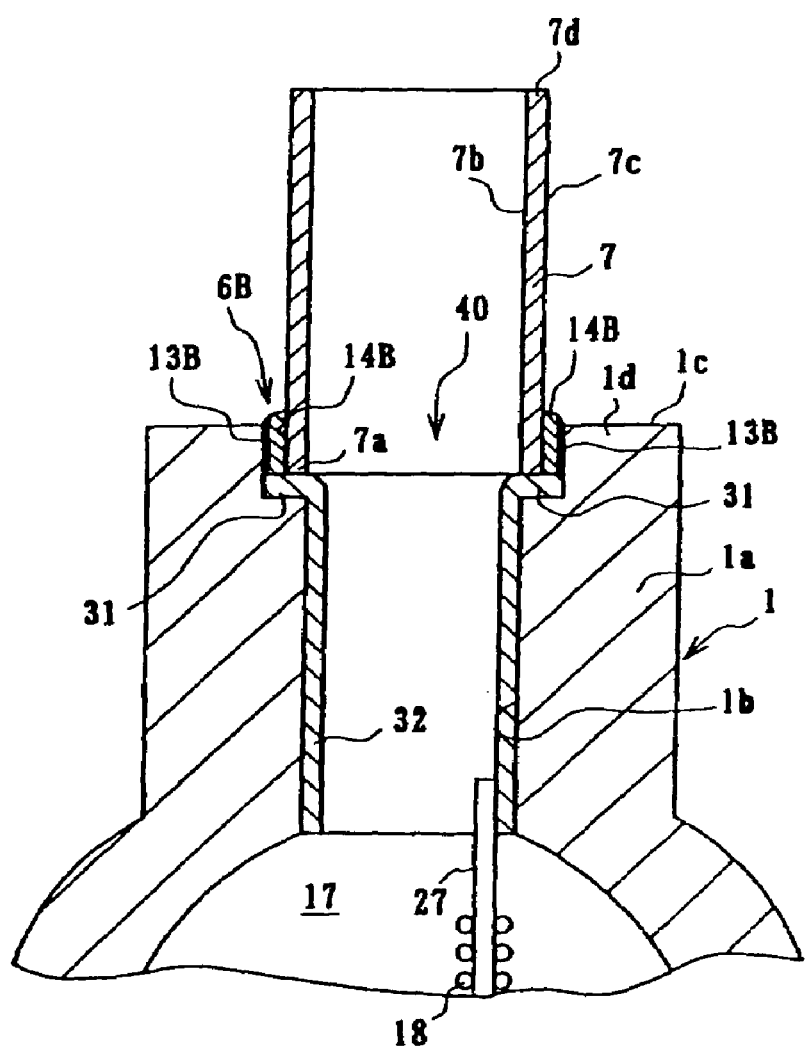

In the embodiment shown in FIG. 17, the inner wall surface 1b of the end portion 1a of the discharge vessel 1 extends straightforwardly in the direction of the main axis of the vessel 1. A hollow 31 is formed in the end portion 1d of the inner wall surface 1b of the end portion 1a. An end portion 7a of a metal member 7 is supported in the hollow 31. A joining portion 6B is interposed between the discharge vessel 1 and the metal member 7 to join them with each other in the hollow 31 to secure the air-tightness. 32 represents a metallized layer.

Figure 18:
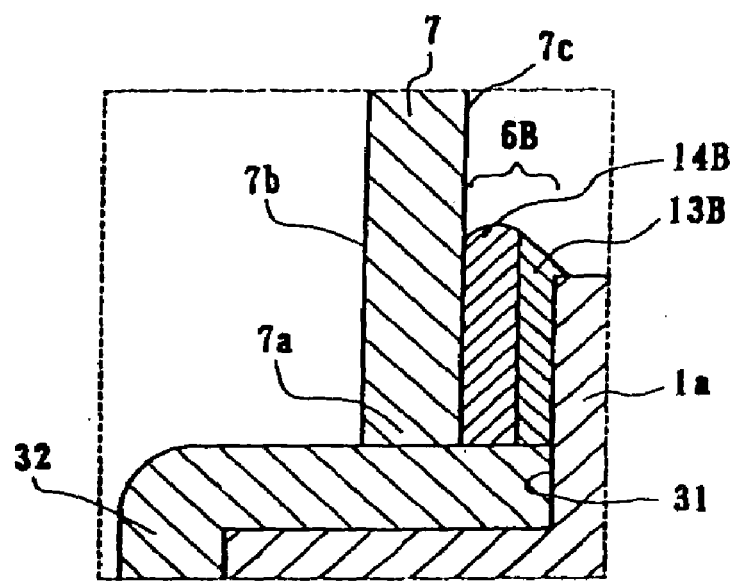
FIG. 18 is an enlarged view showing the region near a hollow 31 shown in FIG. 17.

FIG. 18 is an enlarged view of the region near the hollow 31 shown in FIG. 17. The joining portion 6B has joining material 14B contacting the metal member 7 and an intermediate layer 13B contacting the discharge vessel 1. The metallized layer 32 covers the inner wall surface 1b of the end portion 1a of the discharge vessel 1. The layer 32 further covers the surface of the hollow 31, contacts the edge of the end portion 7a of the metal member 7 and extends to the edge of the joining portion 6B.

Figure 19:
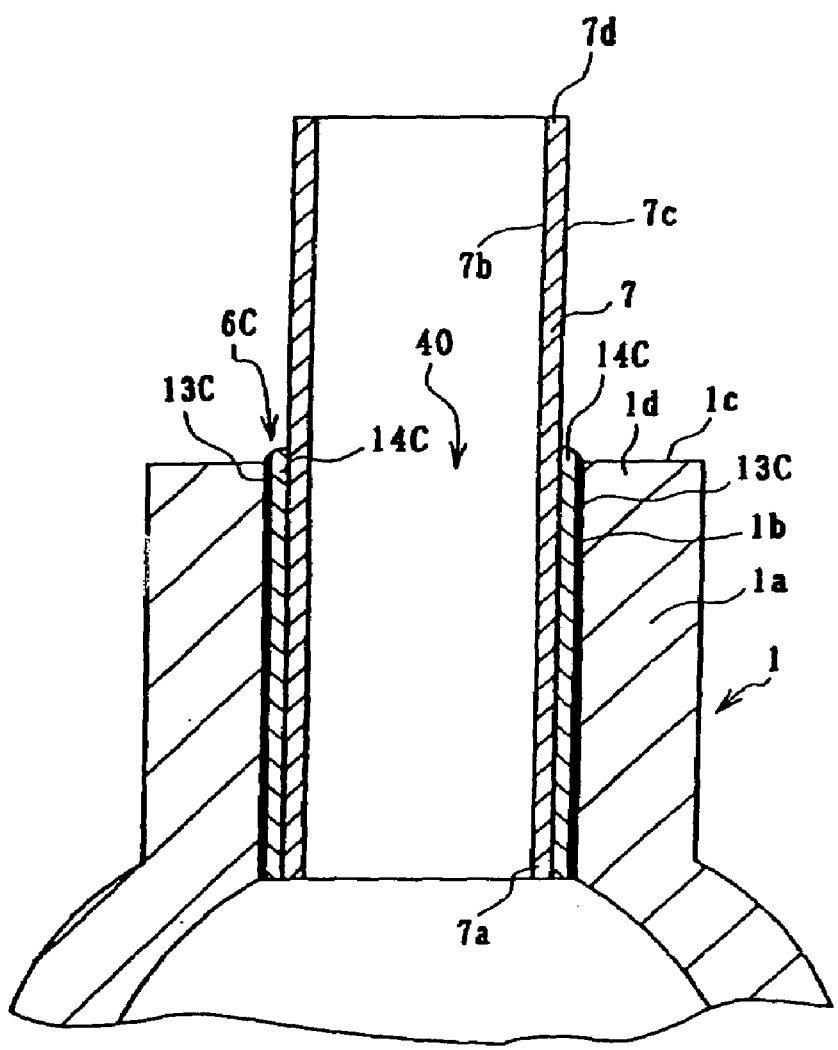
FIG. 19 is a cross sectional view schematically showing an end portion of the lamp according to another embodiment, wherein a metal member 7 is joined with an inner wall surface of the end portion 1a of a discharge vessel 1 substantially along the full length of the surface.

The embodiment of FIG. 19 have no protrusion on the inner wall surface 1b of the end portion 1a of the discharge vessel 1 and the inner wall surface 1b extends substantially straightforwardly. The inner wall surface 1b of the end portion 1a and the metal member 7 are joined with each other substantially along the full length of an opening 40 of the end portion 1a. 6C is a joining material, 13C is an intermediate layer and 14C is a joining material.

Figure 20:
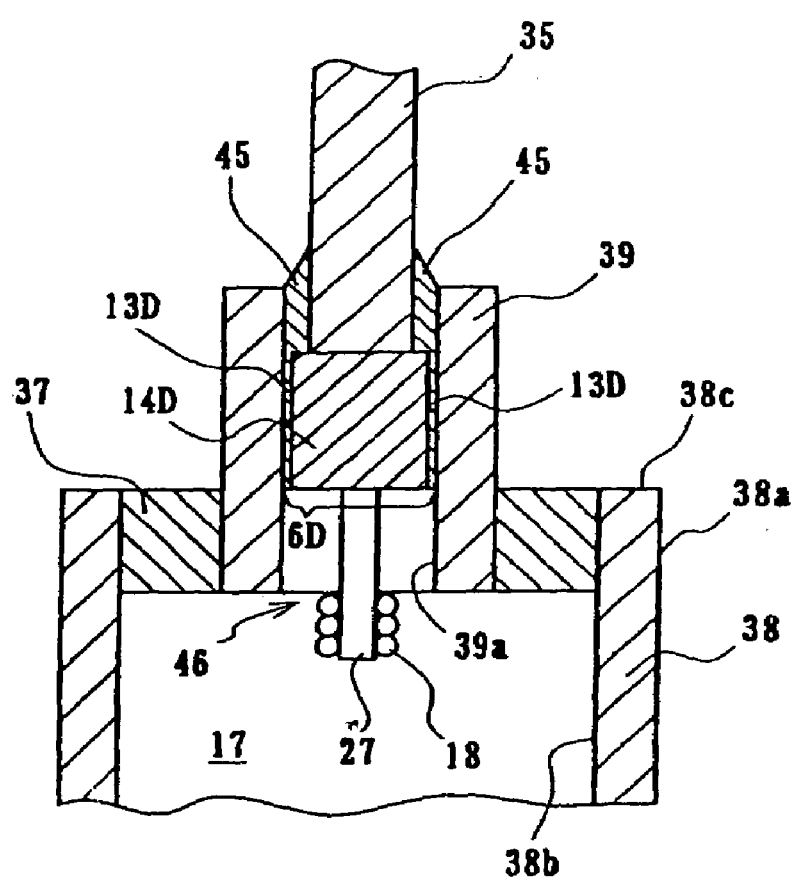
FIG. 20 is a cross sectional view schematically showing an end portion of the lamp according to another embodiment, wherein a through hole 46 of a sealing member 39 is sealed by a joining material 6D of the invention.
Figure 21:
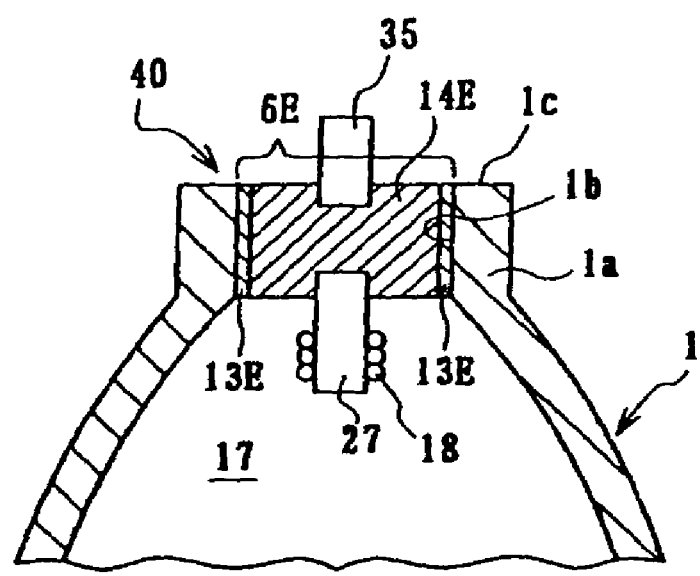
FIG. 21 is a cross sectional view schematically showing an end portion of the lamp according to another embodiment of the invention, wherein an opening 40 of an end portion 1a of the discharge vessel 1 is sealed by a joining material 6E of the invention.

In each embodiment described above, the inventive joining material is provided between the outer surface of the metal member and the inner wall surface of the end portion of the discharge vessel or the sealing member. In the other words, the above inventive joining materials do not seal the opening in the end portion of the discharge vessel or through hole of the sealing member. However, the inventive joining material has excellent resistance against corrosion. It is thus possible to seal the opening of the discharge vessel by itself to preserve the air-tightness, by contacting the intermediate layer with the inner wall surface facing the opening and by sealing it with the intermediate layer and the joining material. Alternatively, the intermediate layer may be contacted with the inner wall surface facing the through hole of the sealing member to seal the through hole by the intermediate layer and joining material with preserved air-tightness. In these cases, the metal member is joined with the joining material without passing through the joining material. FIGS. 20 and 21 relate to such embodiments.

In the embodiment of FIG. 20, a first sealing member 37 is inserted in an inner surface 38b near an end face 38c of the discharge vessel 38 of a high pressure discharge lamp. An outer surface 38a of the discharge vessel 38 extends straightforwardly in its longitudinal direction. The thickness of the discharge vessel 38 is substantially uniform. A second cylindrical sealing member 39 is inserted in the interior of the first sealing member 37. The sealing members 37 and 39 are made of a ceramic or cermet, same as the sealing members described above. The inventive joining portion 6D is formed within the second sealing member 39.

When the joining portion 6D is formed, a porous bone structure is inserted within the sealing member 39. Preferably, a metal member 35 and a metal axis 27 made of molybdenum is joined to the bone structure in advance. When the outer diameter of the structure and the inner diameter of the inner wall surface 39a of the sealing member 39 are strictly adjusted to the same value, it might be impossible to insert the bone structure due to the dimension clearance. Preferably, a clearance of 0.05 to 0.10 mm is provided. When inserting the bone structure and melting a ceramic composition on the bone structure, the ceramic is impregnated into the bone structure to form joining material 14D and an intermediate layer 13D is formed in the clearance of the bone structure and sealing member 39.

Consequently, the through hole 46 of the sealing member 39 is substantially sealed by the joining material 14D and the intermediate layer 13D is formed in the clearance between the joining material 14D and the inner wall surface 39a of the sealing member 39. The axis 27 is joined onto the surface, facing the inner space 17, of the joining material 14D and a metal member 35 is joined to the outer surface of the joining material 14D. A ceramic composition layer 45 is further formed within the clearance between the metal member 35 and sealing member 39.

In the embodiment shown in FIG. 21, as shown in FIG. 20, the inventive joining portion 6E is formed within an opening 40 of the end portion 1a of the discharge vessel 1.

When the joining portion 6E is formed, a porous bone structure is inserted into the inner opening 40 of the end portion 1a of the discharge vessel 1. A metal member 35 and a metal axis 27 are joined to the bone structure in advance. A clearance, preferably of 0.05 to 0.10 mm, is provided between the outer surface of the bone structure and the inner surface 1b of the discharge vessel 1. When inserting the bone structure and melting the ceramic composition on the structure, the molten ceramic is impregnated into the bone structure to form joining material 14E. An intermediate layer 13E is formed in the clearance between the joining material 14E and the discharge vessel 1 at the same time.

The relationship among the clearance between the outer surface of the bone structure and the inner surface of the discharge vessel, easiness of insertion of the electrode system, and easiness of the impregnation of ceramic composition into the bone structure is shown below.

TABLE 1

| Evaluation items clearance (μm) | easiness of insertion | Easiness of impregnation of ceramic composition |
|---|---|---|
| 30 | Reasonable | Excellent |
| 50 | Good | Excellent |
| 80 | Excellent | Excellent |
| 100 | Excellent | Good |
| 120 | Excellent | Reasonable |

If the clearance is not larger than 0.03 mm, the outer surface of the bone structure makes contact with the inner surface of the vessel and thus the bone structure may be damaged when the electrode system inclines to the direction of insertion. On the other hand, if the clearance is 0.12 mm, the ceramic composition is not filled into the bone structure and thus the composition may flow downwardly.

Next, the most preferred process for producing high pressure discharge lamps according to embodiments of the invention will be described. When using a sealing member, powdery raw material (preferably alumina powder) is shaped into a shaped body with a shape, for example of a ring, of the sealing member. At this stage, it is preferred to press-mold granules, granulated with a spray drier or the like, under a pressure of 2000 to 3000 kgf/cm². The resulting shaped body may preferably be subjected to dewaxing and calcination to obtain a calcined body, which is then finish-sintered at a temperature between 1600 to 1900° C. under reducing atmosphere of a dew point of −5 to 15° C.

The dewaxing process may preferably be carried out at a temperature of 600 to 800° C. and the calcination process may preferably be carried out at a temperature of 1200 to 1400° C. The calcination may provide a some degree of strength to the shaped body of the sealing member and prevent the deficiency of leveling of paste due to absorption of a solvent when a material for metallizing is contacted with the sealing member. The calcination may further facilitate the handling of the sealing member. A hollow may be formed, for example, by machining.

Metal powder is formulated, crashed, dried, and milled with an added binder such as ethyl cellulose, acrylic resin or the like, to obtain paste, which is then applied onto the outer surface of the end portion of the metal member and dried at a temperature of 20 to 60° C. The resulting calcined body is sintered under reducing or inert atmosphere or vacuum of a dew point of 20 to 50° C. at a temperature of 1200 to 1700° C.

Also, a main body of a ceramic discharge vessel is shaped, dewaxed and calcined to obtain a calcined body of the discharge vessel. A pre-sintered body of the sealing member is inserted into the end portion of the resulting calcined body, set at a predetermined position and finish-sintered under reducing atmosphere of a dew point of −15 to 15° C. at a temperature of 1600 to 1900° C. to obtain a ceramic discharge vessel.

Also, powder or frit is pre-formulated to a predetermined ceramic composition, crashed, granulated with an added binder such as polyvinyl alcohol or the like, press-molded and dewaxed to obtain molded body. Alternatively, powder or frit for a ceramic is molten and solidified to obtain solid, which is then crashed, granulated with added binder, press-molded and dewaxed to obtain a molded body. In this case, it is preferred to add 3 to 5 weight percent of a binder to the powder, to press-mold at a pressure of 1 to 5 ton, and to dewax.

A nitride or oxynitride, particularly aluminum nitride, is susceptible to moisture and oxygen contents in atmosphere at a high temperature to react with water to produce alumina. The dewaxing of the powder or frit may be carried out at a temperature not higher than 1000° C., more preferably not higher than 900° C. and most preferably at about 700° C.

Such discharge vessel, sealing and metal members, porous bone structure and molded body are assembled as shown in FIG. 1 and heated to a temperature of 1000 to 1600° C. under dry and non-oxidizing atmosphere.

The content of a binder in the molded body may be also reduced to a value as low as 15 weight percent. It is thus possible to assemble the molded body on the discharge vessel, sealing and metal members and bone structure without the dewaxing process of the molded body in atmosphere. The thus obtained assembly may be heated at a temperature between 1000 to 1600° C. under dry and non-oxidizing atmosphere.

Further, paste of the ceramic composition 20' may be applied on and around the metal member 7, bone structure 2 and sealing member 4, as shown in FIG. 3. In this case, the ceramic composition is formulated, crashed, dried and kneaded with ethyl cellulose or an acrylic resin or the like to produce paste. The paste is then applied on a predetermined position and sintered at a temperature of 1600 to 1900° C. under non-oxidizing, dry and reducing atmosphere. It is thus possible to eliminate the necessity of the dewaxing of the ceramic composition for obtaining the molded body.

When a sealing member is not used in a high pressure discharge lamp, a main body of a ceramic discharge vessel is shaped to obtain a shaped body, which is then dewaxed, calcined and finish-sintered. Also, paste of metal powder is produced as described above, applied or printed onto the surface of a metal member and subjected to heat treatment to form a porous bone structure. After the discharge vessel and metal member are assembled and the above described material is set, they are heat-treated as described above to obtain a high pressure discharge lamp.

EXAMPLES (Experiment "A")

The ceramic discharge lamp as described above referring to FIGS. 1 to 10 was produced according to the above process. The ceramic discharge vessel and sealing member were made of alumina ceramics, and a pipe made of molybdenum is used as the metal member. Molybdenum powder with an average particle diameter of 3 µm was used as the porous bone structure, and ethyl cellulose was used as a binder. The molybdenum powder had a tap density of 2.9 g/cc.

The compositions of the impregnated phase and intermediate layer were 10 weight percent of dysprosium oxide, 45 weight percent of aluminum oxide and 45 weight percent of aluminum nitride. The mixture was shaped to obtain a ring-shaped body which is then dewaxed at 700° C. in atmosphere. The thus obtained ring-shaped body was then set as shown in FIG. 1 and heated at 1800° C. under dry and reducing atmosphere so that the mixture was molten and impregnated into the pores of the bone structure and cooled.

The ceramic discharge vessel was subjected to a thermal cycle test. Specifically, in one cycle, its temperature was maintained at a room temperature for 15 minutes, elevated to 1150° C., maintained at 1150° C. for 5 minutes and decreased to a room temperature. 1000 thermal cycles were performed. After that, helium leak test was performed to investigate the leakage of helium. The leak rate was lower than $10^{-10}$ atm·cc·sec. The ceramic vessel according to the invention has resistance under a higher temperature compared with that described in Japanese Patent publication 11-178, 415A, and thus has a higher limit of working temperature. As a result, the discharge lamp having the ceramic vessel has improved efficiency.

1000° C. is a temperature normally utilized in a high pressure discharge lamp and 1150° C. is an overloaded temperature. The resistance against the latter means that the discharge vessel may safely preserve a starter gas and an ionizable light-emitting substance therein for a longer period of time, even when the gas and substance is introduced into the discharge vessel under a pressure higher than a normal value.

FIG. 4 shows a photograph of the joining portion between the metal member 7 and sealing member 4 taken by a scanning electron microscope in the present example. Further, FIGS. 8 and 9 show the results of analysis of aluminum and nitrogen atoms, respectively, by means of EPMA.

(Experiment "B")

A mixture of 10 weight percent of dysprosium oxide, 45 weight percent of alumina and 45 weight percent of aluminum nitride were shaped to obtain a shaped body, which was dewaxed at 700° C. in atmosphere. The thus obtained shaped body was heated at 1800° C. under dry and reducing atmosphere to melt the mixture and cooled. The crystalline phases present in the thus obtained shaped body were identified by means of an X-ray diffraction system. The measurement was performed using a rotating anode type X-ray diffraction system "RINT" supplied by "Rigaku Denki" under the following conditions: CuK α, 50 kV, 300 mA, and 2θ=20 to 70°. The results were shown in FIG. 10.

As shown in FIG. 10, alumina, aluminum-dysprosium garnet and aluminum oxynitride phases were confirmed. The degree of crystallinity of the compound is about 100 percent. The compound is thus proved to be a eutectic crystal. The compound is the same as the ceramics constituting the impregnated phase and intermediate layer shown in FIGS. 4 and 6. As can be seen from FIGS. 4 and 6, in the impregnated phase and intermediate layer, a plurality of crystalline phases having different lightnesses are present so that complex and intricate microstructure is formed. As can be seen from the results of EPMA, regions with higher contents and regions with lower contents of aluminum and nitrogen atoms are present and mixed in the impregnated phase and intermediate layer. It is thus considered that each of the crystalline phases of the intermediate layer and impregnated phase corresponds with each of the aluminum-dysprosium garnet phase, aluminum oxynitride phase or the like.

(Experiment "C")

Molybdenum powder with an average particle diameter of 3 µm was used and ethyl cellulose is used as a binder for producing the bone structure. The molybdenum powder had a tap density of 2.9 g/cc. Mixtures having the following compositions were shaped and dewaxed at 700° C. in atmosphere. The thus obtained shaped body was heated at 1800° C. under dry and reducing atmosphere to melt and impregnate the mixture into the bone structure and then cooled. Samples of composite materials each having dimensions of 5 mm×5 mm were thus produced.

Composition 1: dysprosium oxide 48 weight percent; alumina 52 weight percent; aluminum nitride 0 weight percent Composition 2: dysprosium oxide 30 weight percent; alumina 55 weight percent; aluminum nitride 15 weight percent Composition 3: dysprosium oxide 35 weight percent; alumina 35 weight percent; aluminum nitride 30 weight percent The composite materials according to the compositions were set in a quartz tube and then exposed to $DyI_3$ and $ScI_3$. The results were shown in table 2.

TABLE 2

| Composition | Content of AlN (weight percent) | Time for exposure (hr) | | | | |
|---|---|---|---|---|---|---|
| | | 1000 | 2000 | 3000 | 4500 | 6000 |
| 1 | 0 | Smaller than 5 percent | 5 to 20 percent | 20 to 30 percent | 20 to 30 percent | 30 to 40 percent |
| 2 | 15 | Smaller than 5 percent | 5 to 20 percent | 5 to 20 percent | 5 to 20 percent | 20 to 30 percent |
| 3 | 30 | Smaller than 5 percent | Smaller than 5 percent | 5 to 20 percent | 5 to 20 percent | 5 to 20 percent |

As can be seen from the results, the composite materials according to the present invention have considerably high corrosion resistance against a gas of a rare earth iodide such as $DyI_3$ and $ScI_3$. It is thus possible to considerably improve the resistance of a high pressure discharge lamp by applying the above joining material to the lamp.

(Experiment "D")

A high pressure discharge lamp was produced substantially same as the experiment "A", except that the ceramic composition was composed of 30 weight percent of dysprosium oxide, 55 weight percent of alumina and 15 weight percent of aluminum nitride.

A thermal cycle test was performed on the lamp as described in the experiment "A". 1000 thermal cycles were performed. After that, helium leak test was performed to investigate the leakage of helium. The leak rate was lower than $10^{-10}$ atm·cc·sec. The degree of crystallinity of each of the impregnated phase and intermediate layer was 100 percent.

As described above, the joined body according to the present invention has a joining material resistive against fatigue and fracture, even when the body is subjected to repeated thermal cycles between high and room temperatures.

The present invention has been explained referring to the preferred embodiments. The invention is, however, not limited to the illustrated embodiments which are given by way of examples only, and may be carried out in various modes without departing from the scope of the invention.

The invention claimed is:

1. A joined body comprising a first member, a second member and a joining material interposed between said first and second members, said joining material comprising a porous bone structure with open pores formed therein and made of a sintered product of metal powder and impregnated phase impregnated into said open pores of said structure, said impregnated phase comprising polycrystalline substance made from a metal oxide and at least one of a nitride and an oxynitride.

2. The joined body of claim 1, wherein said metal oxide comprises a rare earth oxide.

3. The joined body of claim 1, wherein said metal oxide includes one or more metal oxide selected from the group consisting of $Al_2O_3$, $Sc_2O_3$, $Y_2O_3$, $La_2O_3$, $Gd_2O_3$, $Dy_2O_3$, $Ho_2O_3$, $Tm_2O_3$, $SiO_2$, $MoO_2$ and $MoO_3$.

4. The joined body of claim 1, wherein said nitride comprises one or more nitride selected from the group consisting of aluminum nitride, boron nitride and silicon nitride.

5. The joined body of claim 1, wherein said oxynitride comprises one or more oxynitride selected from the group consisting of aluminum oxynitride and silicon oxynitride.

6. The joined body of claim 1, wherein said polycrystalline substance is produced by cooling melt containing said metal oxide and at least one of said nitride and said oxynitride.

7. The joined body of claim 1, wherein said polycrystalline substance is an eutectic crystal.

8. The joined body of claim 1, wherein said polycrystalline substance comprises a complex oxide of a rare earth element and aluminum or a complex oxide of a rare earth element, aluminum and silicon.

9. The joined body of claim 8, wherein said polycrystalline substance comprises at least one oxynitride selected from the group consisting of aluminum oxynitride and silicon oxynitride.

10. The joined body of claim 8, wherein said polycrystalline substance comprises alumina.

11. The joined body of claim 1, comprising an intermediate layer between said second member and said joining material.

12. The joined body of claim 11, wherein said intermediate layer comprises a polycrystalline substance made from a metal oxide and at lease one of a nitride and an oxynitride.

13. The joined body of 12, wherein said polycrystalline substance in said intermediate layer is an eutectic crystal.

14. The joined body of claim 12, wherein said intermediate layer is composed of polycrystalline substance comprising a complex oxide of a rare earth element and aluminum or a complex oxide of a rare earth element, aluminum and silicon.

15. The joined body of claim 1, wherein said first member is made of a metal and said second member is made of a ceramics or cermet.

16. The joined body of claim 15, wherein said joining material is contacted with said first member and said intermediate layer is contacted with said second member.

17. An assembly for a high pressure discharge lamp comprising:

a ceramic discharge vessel with an inner space formed therein and end portions, an ionizable light-emitting material and a starter gas being to be contained in said inner space, and an opening being formed in said end portion;

an electrode system provided in said inner space; and said joined body of claim 15, wherein said first member is a metal member, said second member is a sealing member, said metal and sealing members are air-tightly sealed, and said sealing member comprises a through hole formed therein, at least a part of said sealing member being fixed in said opening of said ceramic discharge vessel.

18. The assembly of claim 17, wherein said ionizable light-emitting gas comprises a halide of a rare earth element.

19. The assembly of claim 17, wherein said first member is tube-shaped, at least a part of said electrode system is inserted in said first member, and a clearance of an inner wall of said first member and an outer wall of said electrode system is not smaller than 30 μm and not larger than 150 μm.

20. A high pressure discharge lamp comprising said assembly of claim 17, wherein said ionizable light-emitting substance and said starter gas are contained in said inner space.

21. An assembly for a high pressure discharge lamp comprising:

said joined body of claim 15, said first member being a metal member, said second member being a ceramic discharge vessel comprising an inner space formed therein and end portions, an ionizable light-emitting material and a starter gas being to be contained in said inner space, and an opening being formed in said end portion; and an electrode system provided in said inner space;

wherein said metal member and said discharge vessel are air-tightly sealed.

22. The assembly of claim 21, wherein said ionizable light-emitting gas comprises a halide of a rare earth element.

23. The assembly of claim 21, wherein said first member is tube-shaped, at least a part of said electrode system is inserted in said first member, and a clearance of an inner wall of said first member and an outer wall of said electrode system is not smaller than 30 μm and not larger than 150 μm.

24. A high pressure discharge lamp comprising said assembly of claim 21, wherein said ionizable light-emitting substance and said starter gas are contained in said inner space.

25. A joined body comprising a first member, a second member and a joining material interposed between said first and second members, said joining material comprising a porous bone structure with open pores formed therein and made of a sintered product of metal powder and impregnated phase impregnated into said open pores of said structure, said impregnated phase comprising polycrystalline substance comprising a complex oxide of a rare earth element and aluminum.

26. The joined body of claim 25, wherein said polycrystalline substance comprises at least one oxynitride selected from the group consisting of aluminum oxynitride and silicon oxynitride.

27. The joined body of claim 25, wherein said polycrystalline substance comprises alumina.

28. The joined body of claim 25, comprising an intermediate layer between said second member and said joining material.

29. The joined body of claim 25, wherein said first member is made of a metal and said second member is made of a ceramics or cermet.

30. The joined body of claim 29, wherein said joining material is contacted with said first member and said intermediate layer is contacted with said second member.

31. An assembly for a high pressure discharge lamp comprising:
   a ceramic discharge vessel with an inner space formed therein and end portions, an ionizable light-emitting material and a starter gas being to be contained in said inner space, and an opening being formed in said end portion;
   an electrode system provided in said inner space; and
   said joined body of claim 25,
   wherein said first member is a metal member, said second member is a sealing member, said metal and sealing members are air-tightly sealed, and said sealing member comprises a through hole formed therein, and at least a part of said sealing member being fixed in said opening of said ceramic discharge vessel.

32. The assembly of claim 31, wherein said ionizable light-emitting gas comprises a halide of a rare earth element.

33. The assembly of claim 31, wherein said first member is tube-shaped, at least a part of said electrode system is inserted in said first member, and a clearance of an inner wall of said first member and an outer wall of said electrode system is not smaller than 30 µm and not larger than 150 µm.

34. A high pressure discharge lamp comprising said assembly of claim 31, wherein said ionizable light-emitting substance and said starter gas are contained in said inner space.

35. An assembly for a high pressure discharge lamp comprising:
   said joined body of claim 25, said first member being a metal member, said second member being a ceramic discharge vessel, said discharge vessel comprising an inner space formed therein and end portions, an ionizable light-emitting material and a starter gas being to be contained in said inner space and an opening being formed in said end portion; and
   an electrode system provided in said inner space;
   wherein said metal member and said discharge vessel are air-tightly sealed.

36. The assembly of claim 35, wherein said ionizable light-emitting gas comprises a halide of a rare earth element.

37. The assembly of claim 35, wherein said first member is tube-shaped, at least a part of said electrode system is inserted in said first member, and a clearance of an inner wall of said first member and an outer wall of said electrode system is not smaller than 30 µm and not larger than 150 µm.

38. A high pressure discharge lamp comprising said assembly of claim 35, wherein said ionizable light-emitting substance and said starter gas are contained in said inner space.

* * * * *